(12) United States Patent
Imamura et al.

(10) Patent No.: US 12,105,478 B2
(45) Date of Patent: Oct. 1, 2024

(54) VARIATION REDUCTION MECHANISM OF STOP POSITION OF POINTER

(71) Applicant: CITIZEN WATCH CO., LTD., Tokyo (JP)

(72) Inventors: Kazuya Imamura, Iida (JP); Shoichiro Morita, Kawagoe (JP)

(73) Assignee: CITIZEN WATCH CO., LTD., Tokyo (JP)

(*) Notice: Subject to any disclaimer, the term of this patent is extended or adjusted under 35 U.S.C. 154(b) by 1008 days.

(21) Appl. No.: 16/955,752

(22) PCT Filed: Oct. 24, 2018

(86) PCT No.: PCT/JP2018/039410
§ 371 (c)(1),
(2) Date: Sep. 15, 2020

(87) PCT Pub. No.: WO2019/123821
PCT Pub. Date: Jun. 27, 2019

(65) Prior Publication Data
US 2021/0041835 A1    Feb. 11, 2021

(30) Foreign Application Priority Data
Dec. 20, 2017 (JP) .................. 2017-244166

(51) Int. Cl.
*G04B 19/02* (2006.01)
*G04B 13/02* (2006.01)
*G04B 35/00* (2006.01)

(52) U.S. Cl.
CPC .............. *G04B 19/02* (2013.01); *G04B 13/02* (2013.01); *G04B 35/00* (2013.01)

(58) Field of Classification Search
CPC .......... G04B 13/02–025; G04B 13/021; G04B 13/022; G04B 13/025; G04B 19/02;
(Continued)

(56) References Cited

U.S. PATENT DOCUMENTS 911,534 A * 2/1909 Alford ...................... G04F 1/00
368/327
2,108,776 A * 2/1938 McNicoll ............... G04B 15/00
968/95

(Continued)

FOREIGN PATENT DOCUMENTS

JP     56-167956 A    12/1981
JP     2646946 B2     8/1997
(Continued)

OTHER PUBLICATIONS

International Search Report with its English Translation and Written Opinion of the International Searching Authority for International Application No. PCT/JP2018/039410, mailed on Jan. 29, 2019, in 9 pages.
(Continued)

*Primary Examiner* — Sean Kayes
(74) *Attorney, Agent, or Firm* — Knobbe, Martens, Olson & Bear, LLP

(57) ABSTRACT

A variation reduction mechanism of a stop position of a pointer includes a return gear that is driven in conjunction with a time display mechanism, a slip torque spring (friction member) that contacts the return gear to apply a friction force to the return gear to be driven, and a return spring (return spring member) that applies, to the slip torque spring, a torque of the return gear in a direction (dashed line arrow—R direction) opposite to a normal hand movement direction (arrow R direction).

14 Claims, 20 Drawing Sheets

(58) Field of Classification Search
CPC . G04B 35/00; G04F 7/08; F16H 55/18; F16H 57/12
See application file for complete search history.

(56) References Cited

U.S. PATENT DOCUMENTS

| | | | | | |
|---|---|---|---|---|---|
| 2,928,231 | A | * | 3/1960 | Murrle | G04B 5/14 968/50 |
| 4,127,984 | A | * | 12/1978 | Ogihara | G04B 27/001 464/41 |
| 5,355,979 | A | * | 10/1994 | Stephan | F16D 41/00 188/290 |
| 5,506,820 | A | | 4/1996 | Honzawa et al. | |
| 5,617,376 | A | | 4/1997 | Honzawa et al. | |
| 2011/0051573 | A1 | * | 3/2011 | Tsuchiya | G04B 13/02 368/322 |
| 2012/0014224 | A1 | | 1/2012 | Gabathuler et al. | |
| 2015/0016231 | A1 | * | 1/2015 | Rebetez | G04B 31/00 368/127 |
| 2017/0371300 | A1 | * | 12/2017 | Ikeda | C25D 13/12 |
| 2018/0307183 | A1 | * | 10/2018 | Villar | G04B 13/023 |

FOREIGN PATENT DOCUMENTS

| | | |
|---|---|---|
| JP | 2005-003521 A | 1/2005 |
| JP | 2008-014782 A | 1/2008 |
| JP | 2012-021987 A | 2/2012 |
| JP | 2017-138286 A | 8/2017 |

OTHER PUBLICATIONS

European Search Report issued for European Patent Application No. 18891262.0, dated Aug. 4, 2021 in 7 pages.

* cited by examiner

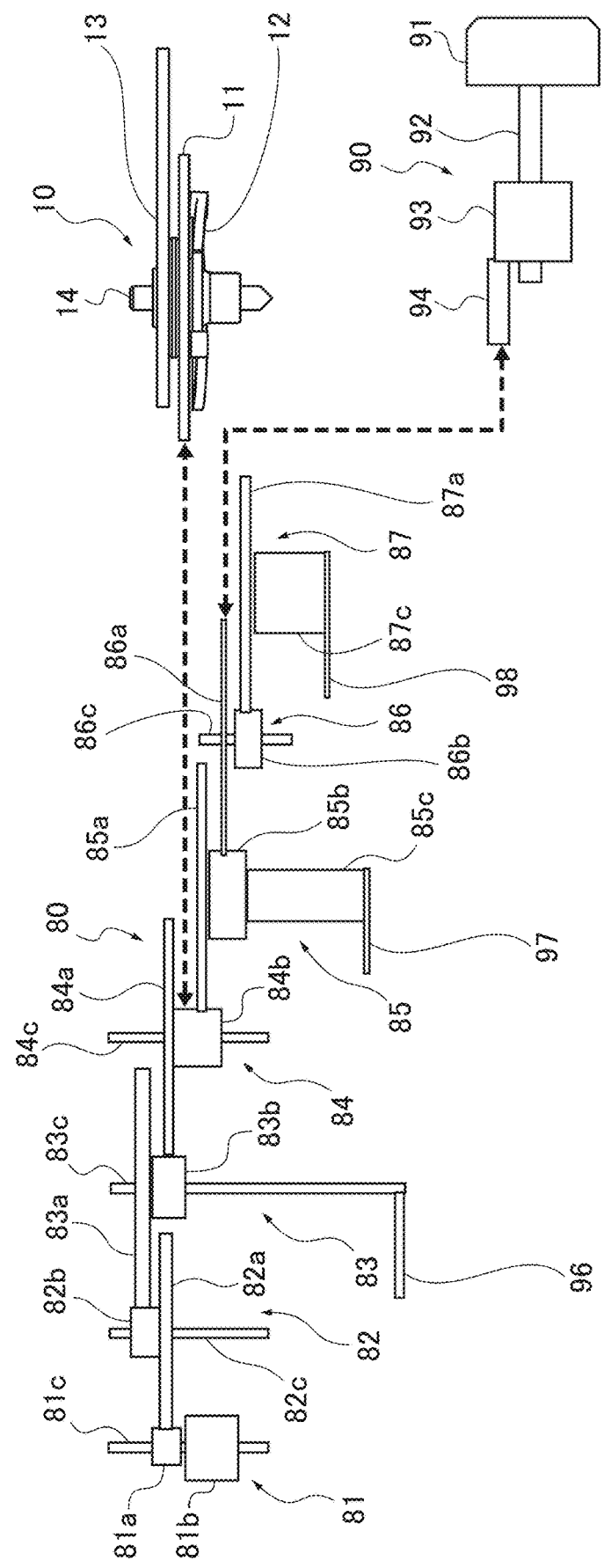

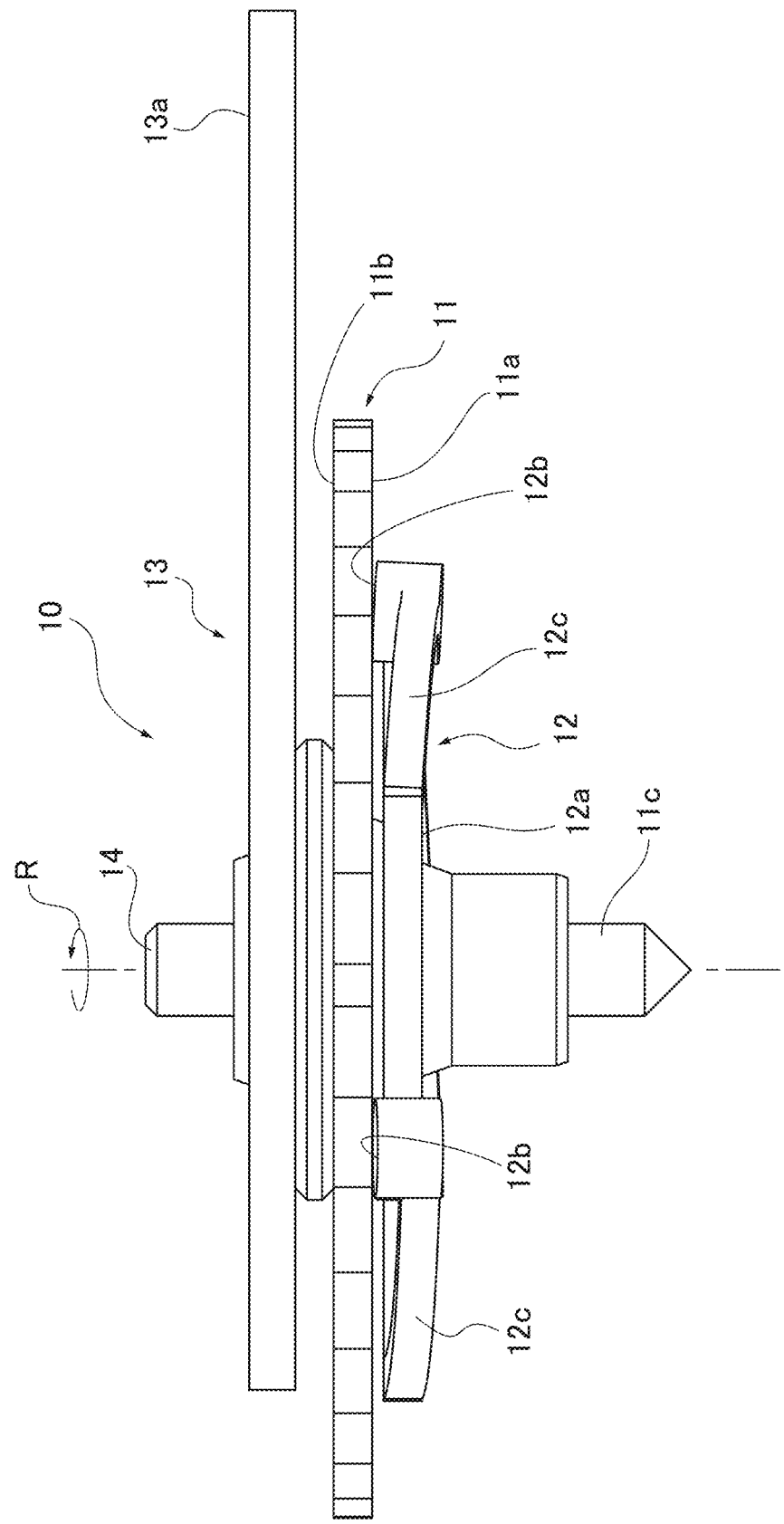

VARIATION REDUCTION MECHANISM OF STOP POSITION OF POINTER

CROSS-REFERENCE TO RELATED APPLICATIONS

This application is the U.S. National Phase under 35 U.S.C. § 371 of International Application PCT/JP2018/039410, filed Oct. 24, 2018, which claims priority to JP Application No. 2017-244166, filed Dec. 20, 2017, the entire contents of each of which are incorporated by reference herein and made a part of this specification.

TECHNICAL FIELD

This disclosure relates to a variation reduction mechanism for reducing variations in a stop position of a pointer.

BACKGROUND ART

A gear train mechanism includes a plurality of gears for rotating pointers of a timepiece. Such a gear train mechanism has backlash for smoothly engaging teeth of the gears to rotate the gears. The engaged teeth thereby have therebetween play (looseness) by the backlash, so that the gears can move within the play.

As the pointer of the timepiece is fixed to the gear, the pointer of the timepiece moves in accordance with the movement of the gear. When the gear voluntarily moves within the play as described above, the pointer also moves in accordance with the movement of the gear. Accordingly, in a timepiece in which hand movement is visually recognized, such as in a hand second, fluctuation of the pointer becomes noticeable.

In order to prevent or control such movement of the gears within the play, a plate spring is pressed to an end surface of the gear to generate a friction force between the gear and the plate spring. In this case, the stop position of the gear is determined based on balance between an inertial moment at rotation of a rotor of a stepping motor for driving, for example, a gear train and a load torque generated by the friction force by the plate spring. The fluctuation of the pointer is thereby controlled; however, the stop position of the pointer easily varies.

Accordingly, a technique is proposed in JP2646946B, for example. With such a technique, a small torque is applied to gears in a direction opposite to a rotation direction (hand movement direction) for displaying a normal time by using a spiral spring to press the teeth of the gears in the direction opposite to the hand movement direction, so as to reduce the amount of backlash (no play).

With this technique, the variations in the stop position of the pointer can be reduced while the fluctuation of the pointer is reduced. More specifically, as the teeth of the gears are always pressed against each other in a constant end portion within the play (end portion in direction opposite to hand movement direction), the teeth can be prevented or controlled from playing within the range of the backlash, so that the fluctuation of the pointer can be reduced. Moreover, as the stop position is determined based on the balance between a return torque (load torque in direction opposite to hand movement direction by spiral spring) and a holding torque of the rotor, the variations in the stop position can be reduced.

SUMMARY

In a timepiece using the above-described spiral spring, the rotation direction is always set in one direction (hand movement direction). However, when a time is corrected in a timepiece, a pointer is moved in the hand movement direction or in the direction opposite to the hand movement direction. Thus, the pointer is sometimes moved in the direction opposite to the hand movement direction. In the timepiece using the above-described spiral spring, when the torque in the opposite direction is applied to the spiral spring, an unexpected load acts on the spiral spring, so that the spiral spring may be damaged.

When a time is corrected by a normal crown operation, the gear with which the spiral spring engages does not engage with the gear for correcting a time. When a time is electromagnetically corrected by motor control, it is necessary to rotate the rotor in the direction opposite to the hand movement direction. In this case, as all the gears rotate in the opposite direction, the unexpected load acts on the spiral spring.

The gears may rotate in the direction opposite to the hand movement direction not only by a time correcting operation but also by various operations corresponding to recent various functions, for example, an operation with an automatic correction function of a pointer position and a return operation from a power saving function.

The present disclosure has been made in view of the above circumstances, and an object of the present disclosure is to provide a variation reduction mechanism of a stop position of a pointer by which teeth of gears are always pressed against each other in a constant end portion (end portion in direction opposite to hand movement direction) within play when rotating in the normal hand movement direction while preventing a spring from being damaged even when the hand movement is carried out in the direction opposite to the hand movement direction.

The present disclosure relates to a variation reduction mechanism of a stop position of a pointer. The variation reduction mechanism includes a return gear that is driven in conjunction with a time display mechanism, a friction member that contacts the return gear to apply a friction force to the return gear to be driven, and a return spring member that applies, to the friction member, a torque of the return gear in a direction opposite to a normal hand movement direction for displaying a time.

BRIEF DESCRIPTION OF DRAWINGS

FIG. 1 is a cross section view schematically and functionally illustrating a gear train mechanism for rotating respective pointers (hour hand, minute hand, and second hand) of a timepiece in which a variation reduction mechanism of a stop position of a pointer (second hand as one example) of each embodiment (Embodiments 1, 2 and Modified Examples) of the present disclosure is incorporated.

FIG. 2 is a cross section view illustrating details of the variation reduction mechanism of the stop position of the pointer.

DESCRIPTION OF EMBODIMENTS

Hereinafter, embodiments of a variation reduction mechanism of a stop position of a pointer according to the present disclosure will be described with reference to the drawings.

Figure 3A:
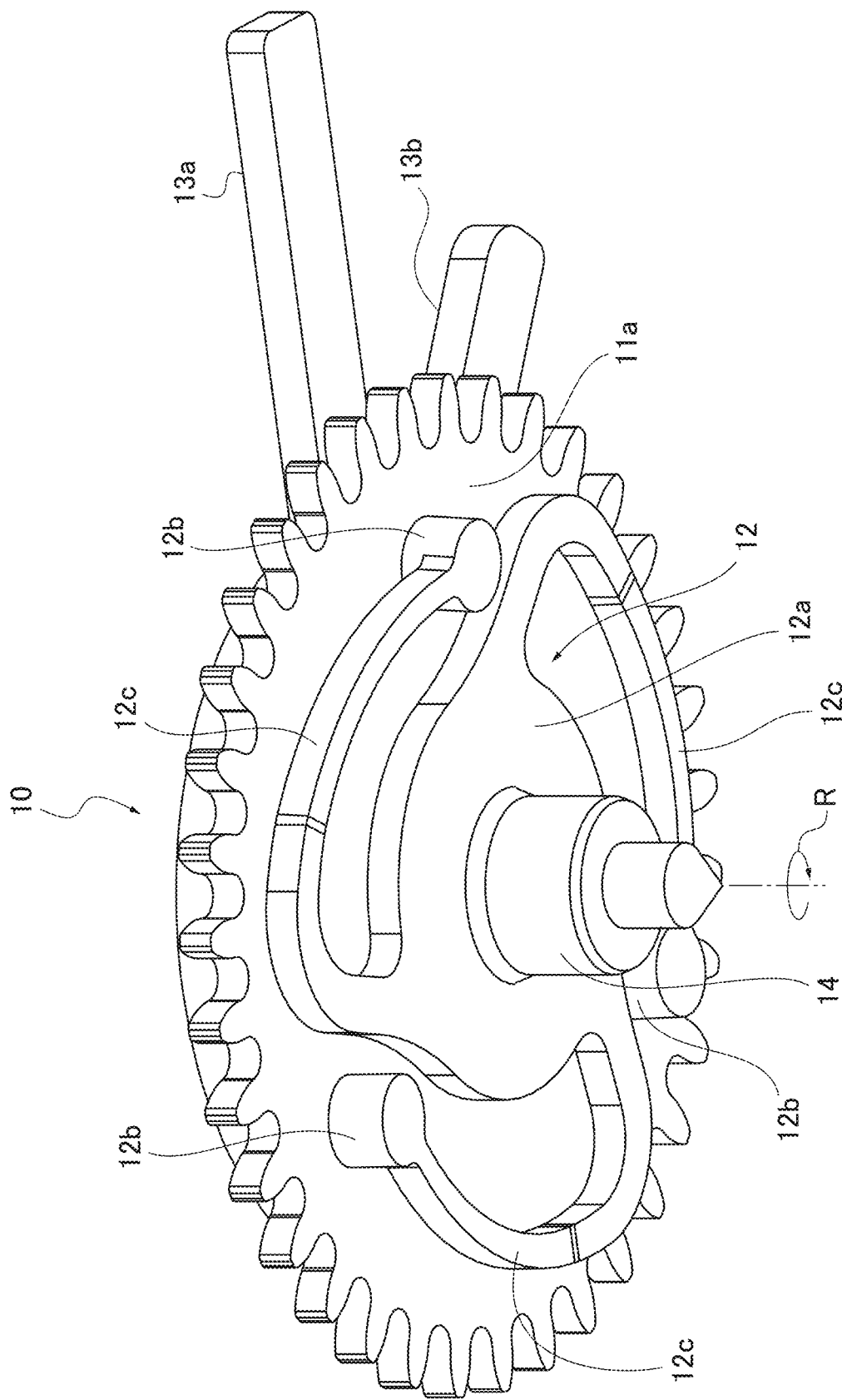
FIG. 3A is a perspective view of the variation reduction mechanism of the stop position of the pointer as seen obliquely downward.
Figure 3B:
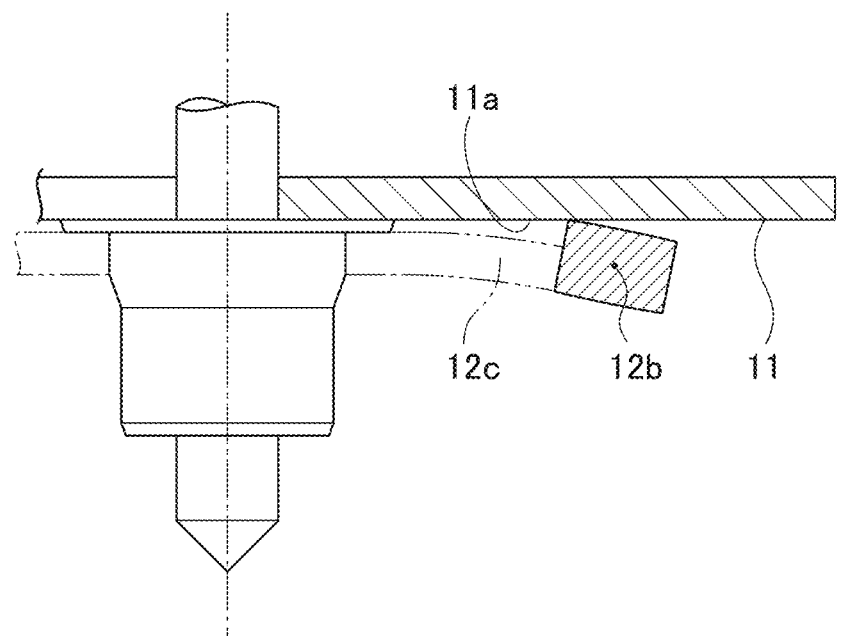
FIG. 3B is a main cross section view illustrating that a projection contacts a lower surface of a return gear at an angle.
Figure 3C:
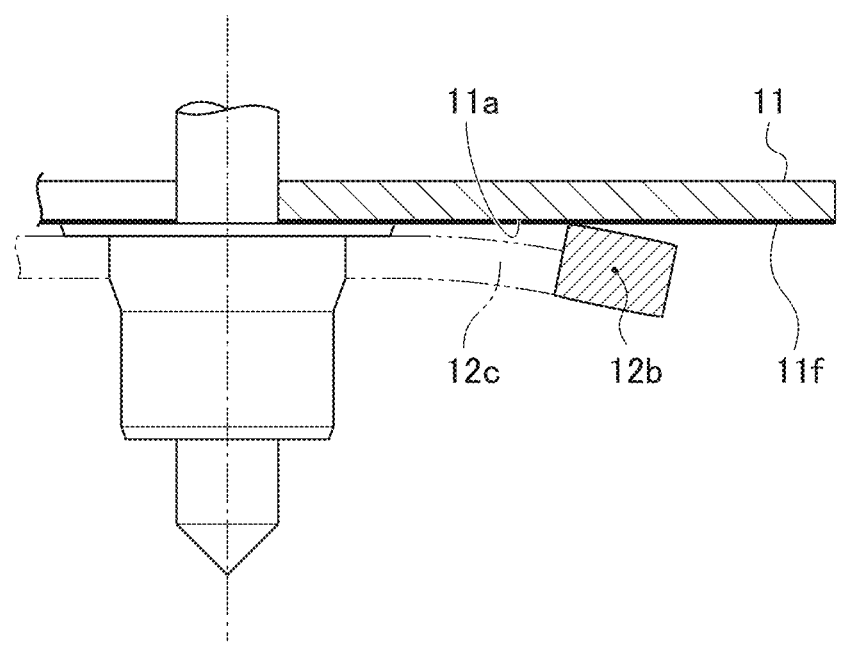
FIG. 3C is a cross section view corresponding to FIG. 3B, and illustrating that the lower surface of the return gear is covered by a hard film.
Figure 4:
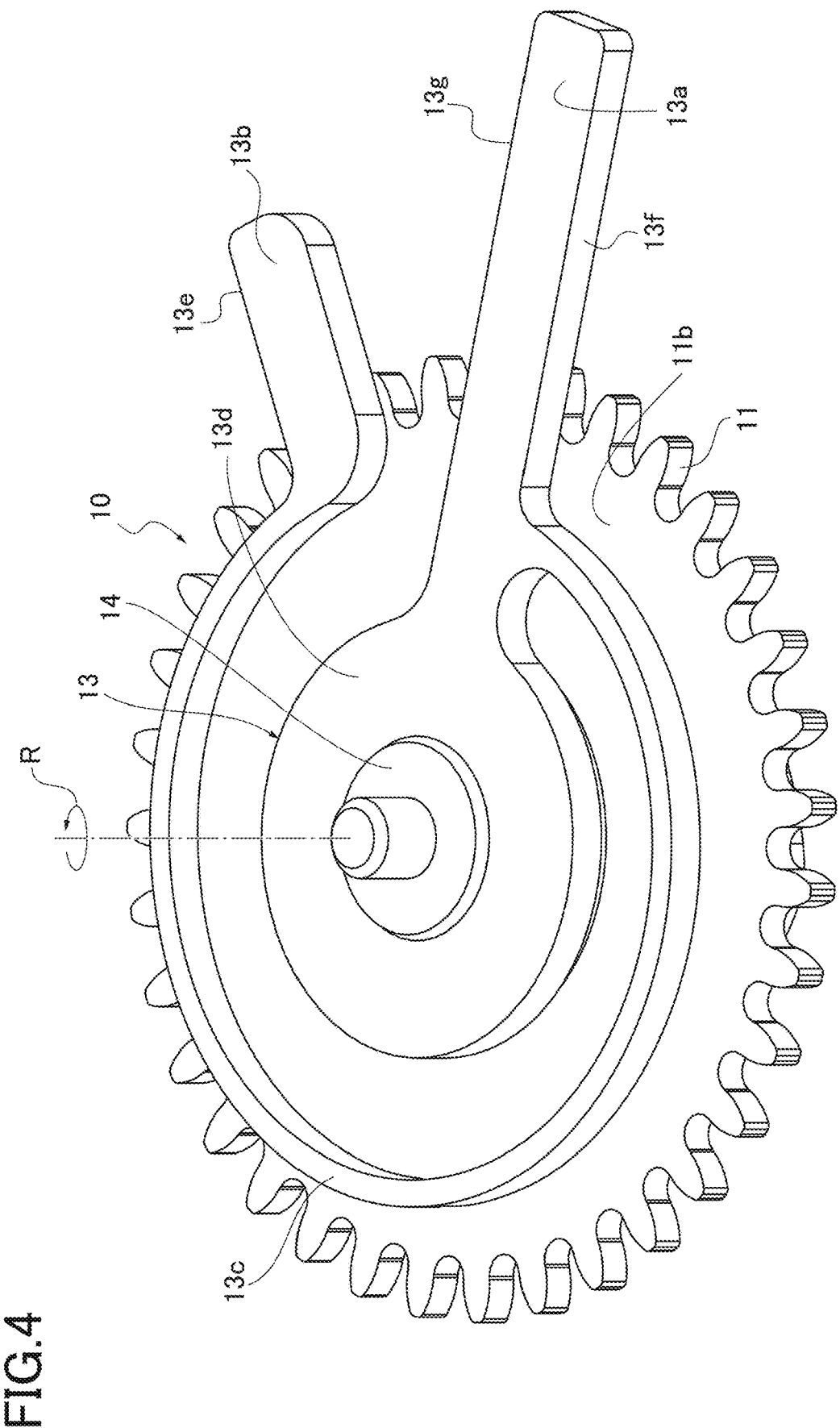
FIG. 4 is a perspective view illustrating the variation reduction mechanism of the stop position of the pointer as seen obliquely upward.

FIG. 1 is a cross section view schematically and functionally illustrating a gear train mechanism 80 for rotating respective pointers (hour hand 98, minute hand 97, and second hand 96) of a timepiece into which a variation reduction mechanism 10 of a stop position of a pointer (second hand 96 as one example) of respective embodiments (Embodiments 1, 2 and Modified Examples) of the present disclosure is incorporated. FIG. 2 is a cross section view illustrating details of the variation reduction mechanism 10. FIG. 3A is a perspective view illustrating the variation reduction mechanism 10 as seen obliquely downward. FIG. 3B is a main cross section view illustrating that a projection 12b contacts a lower surface 11a of a return gear 11 at an angle. FIG. 3C is a cross section view corresponding to FIG. 3B and illustrating that the lower surface 11a of the return gear 11 is covered by a hard film 11f. FIG. 4 is a perspective view illustrating the variation reduction mechanism 10 as seen obliquely upward.

The illustrated gear train mechanism 80 is a time display mechanism including a rotor 81 of a stepping motor, a fifth wheel 82, a fourth wheel 83, a third wheel 84, a center wheel (second wheel) 85, a minute wheel 86, and an hour wheel 87.

The rotor 81 of the stepping motor includes a rotor core 81c of a shaft center of the rotor 81, a permanent magnet 81b, and a rotor pinion 81a. The permanent magnet 81b and the rotor pinion 81a are fixed to the rotor core 81c to rotate integrally with the rotor core 81c.

The fifth wheel 82 includes a gear 82a, a pinion 82b having teeth whose number is smaller than that of the gear 82a, and a stem 82c by which the gear 82a and the pinion 82b are coaxially fixed. The gear 82a of the fifth wheel 82 engages with a rotor pinion 81a.

The fourth wheel 83 includes a gear 83a, a pinion 83b having teeth whose number is smaller than that of the gear 83a, and a shaft 83c by which the gear 83a and the pinion 83b are coaxially fixed. The gear 83a of the fourth wheel 83 engages with the pinion 82b of the fifth wheel 82. The second hand 96 of the timepiece is fixed to the shaft 83c of the fourth wheel 83.

The third wheel 84 includes a gear 84a, a pinion 84b having teeth whose number is smaller than that of the gear 84a, and a stem 84c by which the gear 84a and the pinion 84b are coaxially fixed. The gear 84a of the third wheel 84 engages with the pinion 83b of the fourth wheel 83.

The center wheel 85 includes a gear 85a, a pinion 85b having teeth whose number is smaller than that of the gear 85a, and a shaft 85c by which the gear 85a and the pinion 85b are coaxially fixed. The gear 85a of the center wheel 85 engages with the pinion 84b of the third wheel 84. The minute hand 97 of the timepiece is fixed to the shaft 85c.

The shaft 85c is formed into a hollow cylinder. In FIG. 1, the shaft 83c of the fourth wheel 83 is separated from the shaft 85c of the center wheel 85 for clearly illustrating a transfer path of a driving force (torque) from the rotor 81. In an actual configuration, the shaft 83*c* of the fourth wheel 83 is coaxially disposed in a hollow space of the shaft 85*c* to be coaxial therewith.

The minute wheel 86 includes a gear 86*a*, a pinion 86*b* having teeth whose number is smaller than that of the gear 86*a*, and a stem 86*c* by which the gear 86*a* and the pinion 86*b* are coaxially fixed. The gear 86*a* of the minute wheel 86 engages with the pinion 85*b* of the center wheel 85.

The hour wheel 87 includes a gear 87*a* and a shaft 87*c* to which the gear 87*a* is fixed. The gear 87*a* of the hour wheel 87 engages with the pinion 86*b* of the minute wheel 86. The hour hand 98 of the timepiece is fixed to the shaft 87*c*.

The shaft 87*c* is formed into a hollow cylinder. In FIG. 1, the shaft 87*c* of the hour wheel 87 is separated from the shaft 85*c* of the center wheel 85 for clearly illustrating a transfer path of a driving force (torque) from the rotor 81. In an actual configuration, the shaft 85*c* of the center wheel 85 is disposed in the hollow space of the shaft 87*c* to be coaxial therewith.

In the gear train mechanism 80 configured as described above, the rotation driving force generated in the rotor 81 is sequentially transferred to the fifth wheel 82, the fourth wheel 83, the third wheel 84, the center wheel 85, the minute wheel 86, and the hour wheel 87 while reducing a speed to rotate the second hand 96, the minute hand 97, and the hour hand 98. When the respective pointers (second hand 96, minute hand 97, and hour hand 98) indicate, for example, indexes displayed on a dial of the timepiece, the timepiece displays a time. The respective pointers rotate in a clockwise direction (normal hand movement direction for displaying time).

A correction mechanism 90 of forcibly correcting a time (hour and minute) indicated by each of the pointers rotated by the rotor 81 is combined with the gear train mechanism 80. The correction mechanism 90 includes a crown 91, a winding stem 92, a clutch wheel 93, and a setting wheel 94. The correction mechanism 90 has a known configuration. In the correction mechanism 90, the rotation displacement when the crown 91 rotates about the winding stem 92 by pulling the crown 91 in an axial direction of the winding stem 92 is sequentially transferred to the winding stem 92, the clutch wheel 93, and the setting wheel 94.

The rotation displacement of the setting wheel 94 is then transferred to the gear 86*a* of the minute wheel 86 engaging with the setting wheel 94. The pinion 85*b* of the center wheel 85 engaging with the gear 86*a* of the minute wheel 86 and the gear 87*a* of the hour wheel 87 engaging with the pinion 86*b* of the minute wheel 86 rotate to rotate the center wheel 85 and the hour wheel 87. The rotation displacement of the center wheel 85 and the hour wheel 87 corresponds to the rotation displacement of the crown 91. The minute hand 97 and the hour hand 98 therefore rotate in accordance with the rotation displacement of the crown 91 to correct a minute and an hour to be indicated.

The center wheel 85 in the gear train mechanism 80 of the present embodiment is configured to allow slip between the gear 85*a* and the shaft 85*c*. The slip thus occurs between the shaft 85*c* of the center wheel 85 in which the torque is input from the correction mechanism 90 and the gear 85*a* of the center wheel 85 in which the torque transferred from the rotor 81 is input, and the minute hand 97 rotates in accordance with the torque input from the correction mechanism 90. With the configuration that allows the slip of the center wheel 85, the rotation transferred from the correction mechanism 90 to the gear train mechanism 80 is not transferred to the third wheel 84, the fourth wheel 83, the fifth wheel 82, and the rotor 81 which are disposed in the upstream of the center wheel 85.

Embodiment 1: Configuration of Variation Reduction Mechanism

The variation reduction mechanism 10 of a first embodiment (Embodiment 1) of the present disclosure engages with the pinion 84*b* of the third wheel 84 which is not affected by the rotation transferred from the correction mechanism 90. As the variation reduction mechanism 10 of the present embodiment is allowed to rotate in the direction opposite to the normal hand movement direction for displaying a time in the gear train mechanism 80, the variation reduction mechanism 10 may be disposed to engage with the center wheel 85, the minute wheel 86, and the hour wheel 87 which can rotate in the direction opposite to the normal hand movement direction by the torque input from the correction mechanism 90.

As illustrated in FIG. 2, the variation reduction mechanism 10 includes a return gear 11 (one example of return gear), a slip torque spring 12 (one example of friction member), a return spring 13 (one example of return spring member), and a stem 14. A hole (not shown) is formed in the center of the return gear 11. The return gear 11 rotates about the stem 14 which loosely penetrates through the hole. As the stem 14 loosely contacts the return gear 11, the stem 14 does not rotate integrally with the return gear 11. The stem 14 rotatably supports the return gear 11. The return gear 11 engages with the pinion 84*b* of the third wheel 84, and drives in conjunction with the gear train mechanism.

As illustrated in FIGS. 2, 3A, the slip torque spring 12 is disposed under a lower surface 11*a* of the return gear 11. The slip torque spring 12 is fixed to the stem 14 and rotates integrally with the stem 14. On the other hand, the slip torque spring 12 is not fixed to the return gear 11, and is rotatable independently from the return gear 11. The slip torque spring 12 includes a plate portion 12*a* and an arm portion 12*c*.

The plate portion 12*a* is provided in the center portion of the slip torque spring 12. A hole (not shown) is formed in the center of the plate portion 12*a*. The stem 14 penetrates through the hole to be fixed.

The arm portion 12*c* extends from an outer circumferential edge of the plate portion 12*a* to have a band-like shape. Three arm portions 12*c* are provided at equal angle intervals (120° intervals) around the hole formed in the center of the plate portion 12*a*. In fact, at least one arm portion 12*c* is required; however, a plurality of arm portions 12*c* improve balance in the circumference direction around the hole. When a plurality of arm portions 12*c* are provided, the arm portions 12*c* are provided at equal angle intervals. Such a configuration improves the balance in the circumference direction to be better than a configuration in which the arm portions 12*c* are provided at unequal angle intervals.

Each arm portion 12*c* extends in the circumference direction around the hole of the plate portion 12*a*. A leading end of each arm portion 12*c* comes close to a bottom (base end) of another arm portion 12*c* next to each other. Each arm portion 12*c* has a length in the circumference direction, which corresponds to about 120° around the hole. The extending direction of the arm portion 12*c* is identical with the rotation direction of the return gear 11 engaging with the gear train mechanism 80 rotating in the normal hand movement direction for displaying a time.

Each arm portion 12*c* is made of an elastically deformable material. The leading end of each arm portion is provided with a short cylindrical projection 12b. The projection 12b projects from an upper surface (surface facing lower surface 11a of return gear 11) of the arm portion 12c toward the lower surface 11a of the return gear 11. Each projection 12b contacts the lower surface 11a of the return gear 11 when the plate portion 12a is fixed to the stem 14.

As the arm portion 12c has a constant rigidity, and the projection 12b projects from the upper surface of the arm portion 12c, as illustrated in FIG. 2, the arm portion 12c elastically deforms to bend downward within the elastic deformation region of the arm portion 12c. A restoring force (elastic force) by the elastic deformation of the arm portion 12c becomes a normal force which presses the projection 12b to the lower surface 11a of the return gear 11.

When a torque which rotates the return gear 11 acts on the return gear 11 while the stem 14 and the slip torque spring 12 are prevented from rotating, the return gear 11 rotates about the stem 14 relative to the stem 14 and the slip torque spring 12 because the return gear 11 loosely contacts the stem 14. At this time, with the above-described normal force, a friction force in the direction opposite to the rotation direction is generated in the return gear 11. In addition, when a small load which does not prevent the rotation acts on the stem 14 and the slip torque spring 12 or when no load acts on the stem 14 and the slip torque spring 12, the stem 14 and the slip torque spring 12 rotate together with the rotation of the return gear 11.

The friction force generated in the return gear 11 by the slip torque spring 12 is a load smaller than a load which stops the return gear 11 relative to the torque by the normal hand movement for displaying a time, which is transferred from the pinion 84b of the third wheel 84 with which the return gear 11 engages. Accordingly, while the torque by the normal hand movement for displaying a time is applied to the return gear 11, when the stem 14 and the slip torque spring 12 are prevented from rotating by a torque larger than the torque by the normal hand movement, the friction force by the slip torque spring 12 cannot stop rotating the return gear 11, and slip occurs between the return gear 11 and the slip torque spring 12.

When the timepiece into which the variation reduction mechanism 10 is incorporated includes a mechanism of rotating the rotor 81 in the direction opposite to the normal hand movement direction for displaying a time, namely, when a time is corrected by rotating the rotor 81 in the direction opposite to the normal hand movement direction with a control device of a timepiece as a wave correction timepiece in addition to a manual time correction mechanism with the correction mechanism 90, for example, the torque in the direction opposite to the normal hand movement direction is applied to the return gear 11 from the third wheel 84.

In this case, when the stem 14 and the slip torque spring 12 are prevented from rotating by the torque larger than the torque in the opposite direction, which is applied to the return gear 11, the friction force by the slip torque spring 12 cannot stop the rotation of the return gear 11, and the slip occurs between the return gear 11 and the slip torque spring 12.

In addition, as the projection 12b projects from the upper surface of the arm portion 12c, as illustrated in FIG. 3B, when the arm portion 12c bends downwardly, the projection 12b which contacts the lower surface 11a of the return gear 11 also inclines relative to the lower surface 11a along the bent arm portion 12c. That is to say, when the upper surface of the projection 12b is parallel to the upper surface of the arm portion 12c, the upper surface of the projection 12b provided in the leading end of the arm portion 12c inclines by the bent arm portion 12c at a predetermined angle other than 0° without being parallel to the lower surface 11a of the return gear 11.

As a result, the entire upper surface of the projection 12b does not contact the lower surface 11a of the return gear 11, and a part of the upper surface (corner portion connected to arm portion 12c) of the projection 12b contacts the lower surface 11a of the return gear 11. When a part of the upper surface of the projections 12b contacts the lower surface 11a of the return gear 11, the surface pressure of the projection 12b to the lower surface 11a becomes higher than that when the entire upper surface of the projection 12b contacts the lower surface 11a. The lower surface 11a of the return gear 11 may wear or be shaved by the contact of a high surface pressure with the inclined projection 12b.

It is therefore preferable for the return gear 11 to be made of a material having a hardness higher than that of the projection 12b (slip torque spring 12). The slip torque spring 12 is a made of a general elastic material (for example, stainless). The material having a hardness higher than that includes, for example, carbon steel, nickel (Ni), and phosphorus compound (NiP) in which phosphorus (P) is added to nickel (Ni). The high hardness material is not limited to the exampled materials, and any material may be used as long as it has a hardness higher than that of the projection 12b.

In addition to the high hardness materials by the own properties as the above-described materials, the high hardness material includes a material having a high hardness by a hardening process such as a heat process. More specifically, the return gear 11 may be made of the same material (for example, stainless steel) as the slip torque spring 12, and the return gear 11 is processed by the hardening process, so as to obtain the return gear 11 having a hardness higher than that of the slip torque spring 12. The above-described high hardness materials by the own properties, for example, carbon steel, nickel (Ni), and phosphorus compound (NiP) in which phosphorus (P) is added to nickel (Ni) may be processed by the hardening process.

When the return gear 11 is made of a material having a hardness higher than that of the projection 12b (slip torque spring 12), the lower surface 11a of the return gear 11 is prevented or controlled from wearing or being shaved.

Instead of the return gear 11 itself made of the high hardness material (including high hardness material by hardening process), only the lower surface 11a of the return gear 11 that the projection 12b contacts may be made of the material having a hardness higher than that of the projection 12b. More specifically, as illustrated in FIG. 3C, for example, a hard film 11f having a hardness higher than that of the projection 12b may be provided on the lower surface 11a. The hard film 11f includes, for example, a DLC (diamond like carbon) film. The hard film 11f is not limited to the exampled DLC film, and may include any film as long as it has a hardness higher than that of the projection 12b. A method of providing a hard film is not limited to a specific method such as an applying method and a plating method.

As described above, when the lower surface 11a of the return gear 11 is covered by the hard film 11f harder than the projection 12b (slip torque spring 12), the lower surface 11a of the return gear 11 is prevented or controlled from wearing or being shaved.

When the surface pressure of the projection 12b to the lower surface 11a is low, the lower surface 11a of the return gear 11 may not wear or may not be shaved. In this case, it is not necessary for the return gear 11 to be made of the high hardness material (including high hardness material by hardening process) or to provide the hard film 11f on the lower surface 11a.

More specifically, in the variation reduction mechanism according to the present disclosure, it is not always necessary for the return gear to be made of the high hardness material (including high hardness material by hardening process) or to provide the hard film.

On the other hand, even when the surface pressure of the projection 12b to the lower surface 11a of the return gear 11 is low, the return gear 11 may be made of the high hardness material (including high hardness material by hardening process) or the hard film may be provided on the lower surface 11a.

As illustrated in FIG. 4, the return spring 13 is disposed above the upper surface 11b of the return gear 11. The return spring 13 is fixed to the stem 14, and rotates together with the stem 14. Namely, the return spring 13 and the slip torque spring 12 integrally rotate. The return spring 13 is not fixed to the return gear 11, and is rotatable independently from the return gear 11. The return spring 13 includes a base portion 13d (one example of fixed member), a stopper portion 13a (one example of regulation member), and a spring portion 13c (one example of spring portion).

The base portion 13d is a plate provided in the center portion of the return spring 13. A hole (not shown) is formed in the center of the base portion 13d. The stem 14 penetrates through the hole to be fixed. The base portion 13d does not contact the upper surface 11b of the return gear 11.

The stopper portion 13a is provided in the outer circumference edge of the base portion 13d in the radial direction to project outward from the outer circumference of the return gear 11. The stopper portion 13a regulates the rotation range of the return spring 13 within the range of a space 75 provided in a main plate 70 of the after-described movement.

The spring portion 13c extends in the circumference direction around the stem 14 from a part of the stopper portion 13a located inside the radius of the return gear 11. A base end of the spring portion 13c is a fixed end connected to the stopper portion 13a while a leading end of the spring portion 13c is a free end apart from the stopper portion 13a. The spring portion 13c is made of an elastically deformable material. When the spring portion 13c is elastically deformed by moving the fixed end and the free end to be close to each other, a restoring force (elastic force) by the elastic deformation is generated in the spring portion 13c. Such a restoring force restores the distance between the free end and the fixed end to an original distance. The spring portion 13c therefore applies the rotation torque to the base portion 13d.

The free end of the spring portion 13c is provided with a hook portion 13b projecting outward in the radial direction from the outer circumference of the return gear 11. The hook portion 13b includes a side edge 13e provided on the stretched side of the spring portion 13c. When the variation reduction mechanism 10 is incorporated into the movement of the timepiece, the side edge 13e contacts a fixed portion of the main plate of the movement, for example.

Operation of Variation Reduction Mechanism

Figure 5:
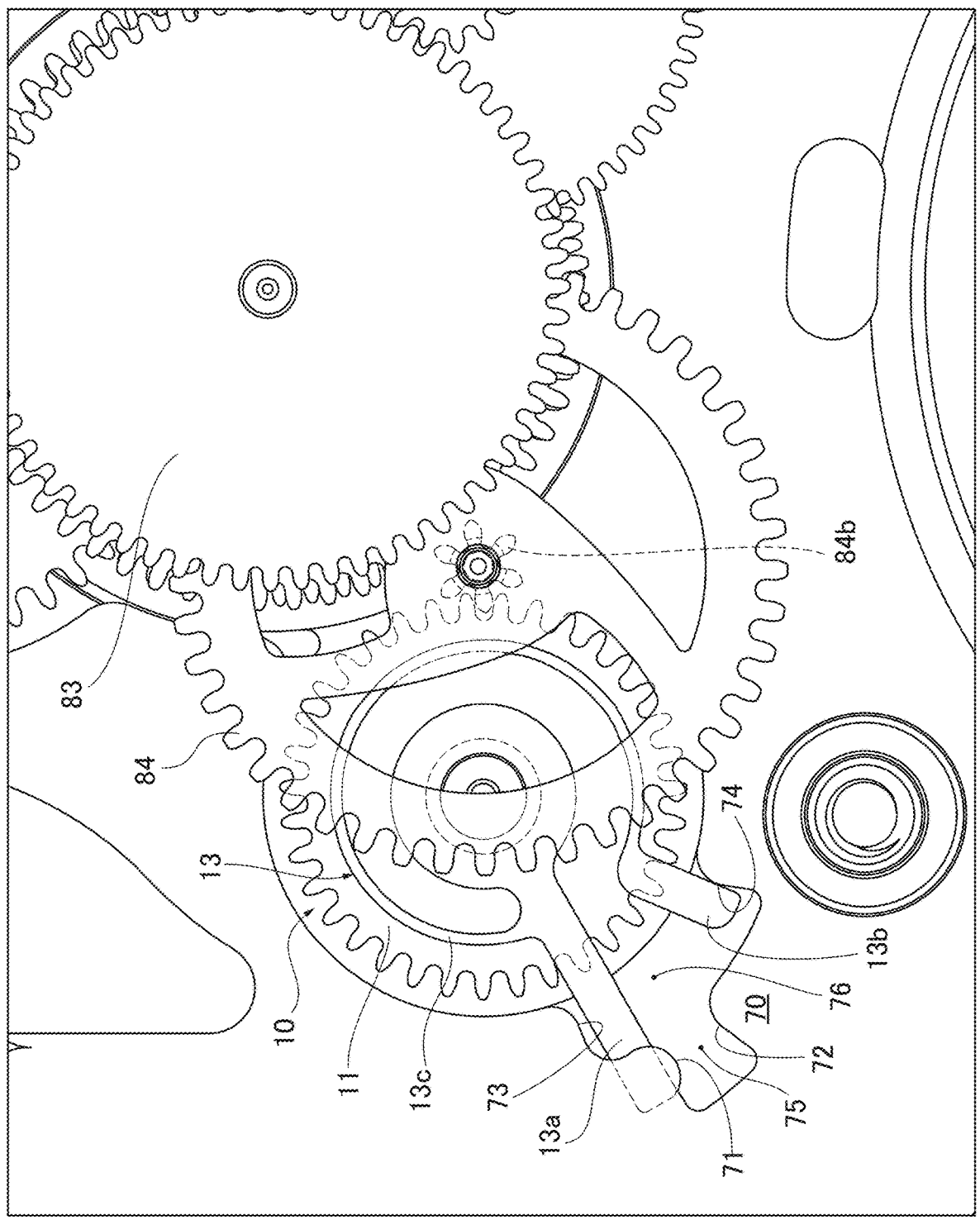
FIG. 5 is a view describing an operation of the variation reduction mechanism of the stop position of the pointer, and illustrating the mechanism before being incorporated into a movement and an elastic force is not generated in a spring portion of a return spring.
Figure 6:
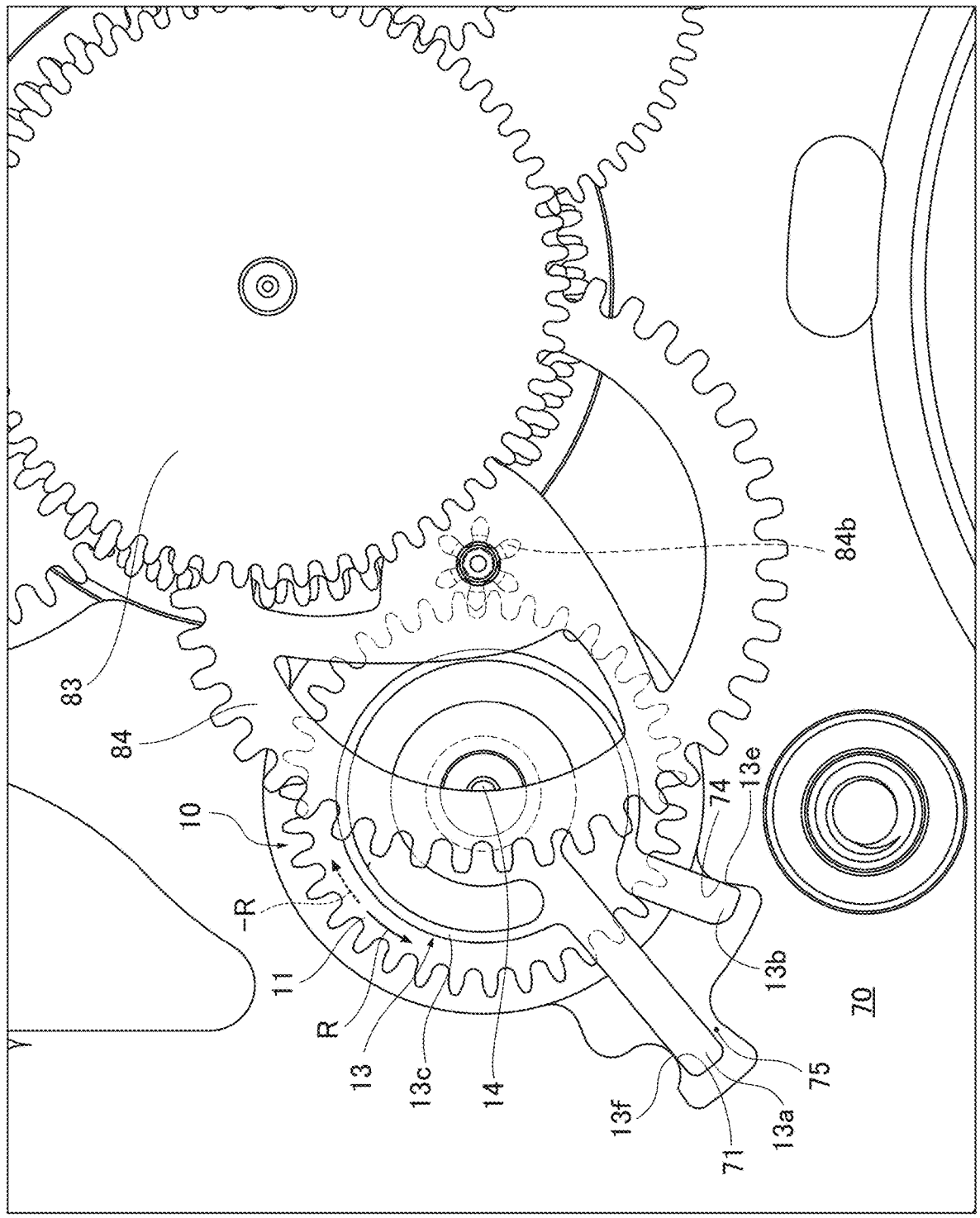
FIG. 6 is a view (part 1) describing an operation of the variation reduction mechanism, and illustrating that the mechanism is incorporated into the movement and the elastic force is generated in the spring portion of the return spring.
Figure 7:
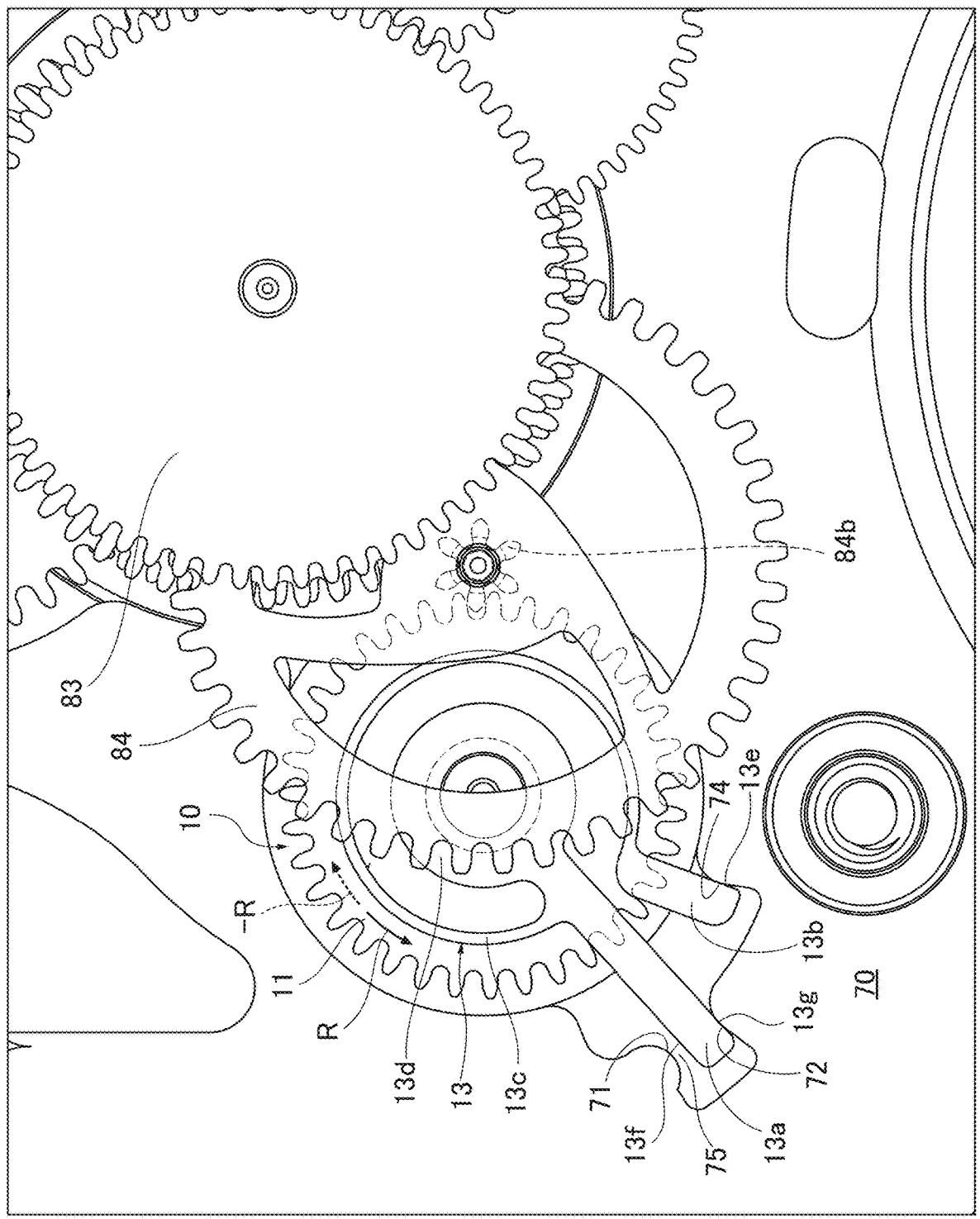
FIG. 7 is a view (part 2) describing the operation of the variation reduction mechanism, and illustrating that the mechanism is incorporated into the movement and the elastic force is generated in the spring portion of the return spring.

Next, the operation of the variation reduction mechanism 10 configured as described above will be described. FIGS. 5, 6, 7 are views describing the operation of the variation reduction mechanism 10. FIG. 5 illustrates the variation reduction mechanism 10 before being incorporated into the movement, and in which the elastic force is not generated in the spring portion 13c of the return spring 13. FIGS. 6, 7 illustrate the variation reduction mechanism 10 after being incorporated into the movement, and in which the elastic force is generated in the spring portion 13c of the return spring 13.

As illustrated in FIG. 5, in the timepiece into which the variation reduction mechanism 10 of the stop position of the second hand 96 of the present embodiment is incorporated, the main plate 70 of the movement includes the space 75 in which the stopper portion 13a is disposed, and a space 76 in which the hook portion 13b is disposed. The space 75 is provided between walls 71, 72 of the main plate. The space 75 has a length in which the stopper portion 13a slightly moves in the circumference direction around the stem 14. In addition, the space 76 is provided between walls 73, 74 of the main plate. The space 76 is provided inside the space 75. However, it is not always necessary to provide the space 76 as long as the wall 74 to which the hook portion 13b is hooked is provided.

When the variation reduction mechanism 10 is incorporated into the movement, as illustrated in FIG. 6, the stopper portion 13a is disposed in the space 75 and the hook portion 13b is disposed in the space 76. At this point, the spring portion 13c is elastically deformed in the direction in which the fixed end and the free end come close to each other. Namely, the spring portion 13c is elastically deformed in the direction in which the stopper portion 13a and the hook portion 13b come close to each other. That is to say, the spring portion 13c generates the elastic force in the direction in which the stopper portion 13a and the hook portion 13b separate. A side edge 13f of the stopper portion 13a, which is the stretched side edge of the spring portion 13c, thereby contacts the wall 71 of the main plate, and a side edge 13e of the hook portion 13b, which is the stretched side edge of the spring portion 13c, contacts the wall 74 of the main plate, so that an initial elastic force acts on the return spring 13.

In the return spring 13, the fixed end of the spring portion 13c is connected to the stopper portion 13a, the stopper portion 13a is connected to the base portion 13d, and the base portion 13d is connected to the slip torque spring 12 through the stem 14. The initial elastic force is thereby applied to the return gear 11 through the projection 12b of the slip torque spring 12.

The torque in the normal hand movement direction for displaying a time is transferred from the pinion 84b of the third wheel 84 to the return gear 11, and the rotation direction by the torque corresponds to an arrow R direction (counterclockwise direction in FIG. 6). On the other hand, the direction of the torque by the elastic force received from the slip torque spring 12 corresponds to the direction (clockwise direction in FIG. 6) opposite to the arrow R direction. In response to the torque by the elastic force received from the slip torque spring 12, the teeth of the return gear 11 apply the torque in the direction opposite to the normal hand movement direction for displaying a time to the pinion 84b of the third wheel 84.

Accordingly, the torque in the direction opposite to the normal hand movement direction for displaying a time is applied to the fourth wheel 83 and the fifth wheel 82 in the upstream of the third wheel 84 in the driving force transferring direction. The teeth of the third wheel 84, the fourth wheel 83, and the fifth wheel 82 are thereby pressed against each other on one side of the backlash. The fluctuation caused by the backlash and the variations in the stop position of the second hand 96 fixed to the fourth wheel 83 are thereby prevented or controlled.

When the torque in the normal hand movement direction for displaying a time is transferred from the pinion 84b of the third wheel 84 to the return gear 11 in FIG. 6, the return gear 11 starts rotating in the arrow R direction by the torque. The slip torque spring 12 illustrated in FIGS. 2, 3A is disposed on the lower surface 11a of the return gear 11. The slip torque spring 12 starts rotating in the arrow R direction together with the return gear 11 by the friction force of the projection 12b.

As the return spring 13 is connected to the slip torque spring 12 through the stem 14, the return spring 13 rotates in the arrow R direction as illustrated in FIG. 7 together with the slip torque spring 12. At this time, the base portion 13d and the stopper portion 13a of the return spring 13 rotate together with the slip torque spring 12 while the hook portion 13b does not rotate because the front side edge 13e of the hook portion 13b in the rotation direction (arrow R direction) contacts the wall 74 of the main plate 70. As a result, the elastic deformation of the spring portion 13c increases in accordance with the increase in the rotation of the slip torque spring 12.

When a side edge 13g of the stopper portion 13a, which is closer to the hook portion 13b, contacts the opposite wall 72 defining the space 75, the rotation of the return spring 13 in the arrow R direction is stopped. As a result, the rotation of the slip torque spring 12 connected to the return spring 13 through the stem 14 is stopped. On the other hand, as the torque by the normal hand movement operation for displaying a time keeps acting on the return gear 11, the return gear 11 keeps rotating in the arrow R direction, and the slip occurs between the projection 12b and the lower surface 11a of the return gear 11. After that, the return gear 11 keeps rotating in the arrow R direction while receiving the constant friction force (dynamic friction force) from the projection 12b.

During this period, the return gear 11 rotates in the arrow R direction by the hand movement operation, and the slip torque spring 12 slips. After that, the rotation torque in a dashed line arrow—R direction is applied to the stem 14 by the reaction force from the return spring 13. The rotation torque in the dashed line arrow—R direction is also transferred to the return gear 11 through the slip torque spring 12 integrated with the stem 14, and the rotation torque (load torque) in the direction opposite to the normal hand movement direction is transferred to the wheels (fourth wheel 83, fifth wheel 82, and rotor 81) before the third wheel 84 engaging with the return gear 11. The amount of backlash is thereby reduced between the respective wheels (fourth wheel 83, fifth wheel 82 and the rotor 81) before the third wheel 84, and the fluctuation of the second hand 96 is controlled, and the variations in the stop position of the second hand 96 fixed to the fourth wheel 83 are reduced (prevented or controlled).

When a time is corrected by rotating the rotor 81 in the direction opposite to the normal hand movement direction in the timepiece, the torque in the direction opposite to the normal hand movement direction is applied to the return gear 11 from the third wheel 84, and the return gear 11 rotates in the dashed line arrow—R direction (clockwise direction in FIGS. 6, 7) from the position in FIG. 7 to the position in FIG. 6. In this case, the torque in the direction which releases the elastic force of the spring portion 13c is applied to the return gear 11 through the slip torque spring 12. However, as illustrated in FIG. 6, when the side edge 13f of the stopper portion 13a contacts the wall 71 defining the space 75, the return spring 13 and the slip torque spring 12 do not rotate.

At this time, the slip occurs between the projection 12b of the slip torque spring 12 and the lower surface 11a of the return gear 11, and only the return gear 11 keeps rotating, and the slip torque spring 12, the stem 14, and the return spring 13 merely receive the friction force from the return gear 11 through the projection 12b, and are not damaged.

As described above, according to the variation reduction mechanism 10 of the stop position of the second hand 96 of the present embodiment, even though the torque in the direction opposite to the normal hand movement direction for displaying a time is applied, the damage can be prevented, and in the rotation in the normal hand movement direction, the teeth of the gears are pressed against each other in the end portion within the backlash in the direction opposite to the normal hand movement direction, so that the variations in the stop position of the second hand 96 can be prevented or controlled to be reduced.

In the variation reduction mechanism 10 of the stop position of the second hand 96 of the present embodiment, the stopper portion 13a contacts the wall 72 of the space 75. The elastic deformation of the spring portion 13c is thereby regulated within the constant range. The stopper portion 13a also contacts the wall 72 of the space 75 before the torque in the direction opposite to the normal hand movement direction, which is generated in the return spring 13 by the elastic force according to the elastic deformation, exceeds the torque by the friction force between the return gear 11 and the return spring 13 (friction force generated between return gear 11 and slip torque spring 12).

Accordingly, the torque by the elastic force does not exceed the torque by the friction force between the return gear 11 and the return spring 13, and the torque by the constant elastic force according to the elastic deformation of the spring portion 13c when the stopper portion 13a contacts the wall 72 keeps acting on the return gear 11.

On the other hand, when the stopper portion 13a is not provided, the return spring 13 keeps rotating until the torque by the elastic force of the spring portion 13c exceeds the torque by the friction force between the return gear 11 and the return wheel plate 15. At the exceeding, the return spring 13 drastically slips to the return gear 11, and the torque in the opposite direction, which acts on the return gear 11 may largely change.

As described above, with the relative sizes of the space 75 and the stopper portion 13a, the stopper portion 13a contacts the wall 72 before the torque by the elastic force exceeds the torque by the friction force between the return gear 11 and the slip torque spring 12. The constant torque in the opposite direction, which acts on the return gear 11, can be maintained.

In the variation reduction mechanism 10 of the present embodiment, a part of the slip torque spring 12 which contacts the return gear 11 is the projection 12b pressed to the return gear 11 by the elastic force of the arm portion 12c. The friction force by the return gear 11 can be easily changed by changing the height of the projection. The area which contacts the return gear 11 can be also changed by changing the area of the projection 12b.

In the variation reduction mechanism 10 of the present embodiment, the return spring 13 and the slip torque spring 12 are integrated through the stem 14. Thus, the workability of incorporating the variation reduction mechanism 10 into the movement is better than that in which the return spring 13 and the slip torque spring 12 are not integrated.

Modified Example

Figure 8:
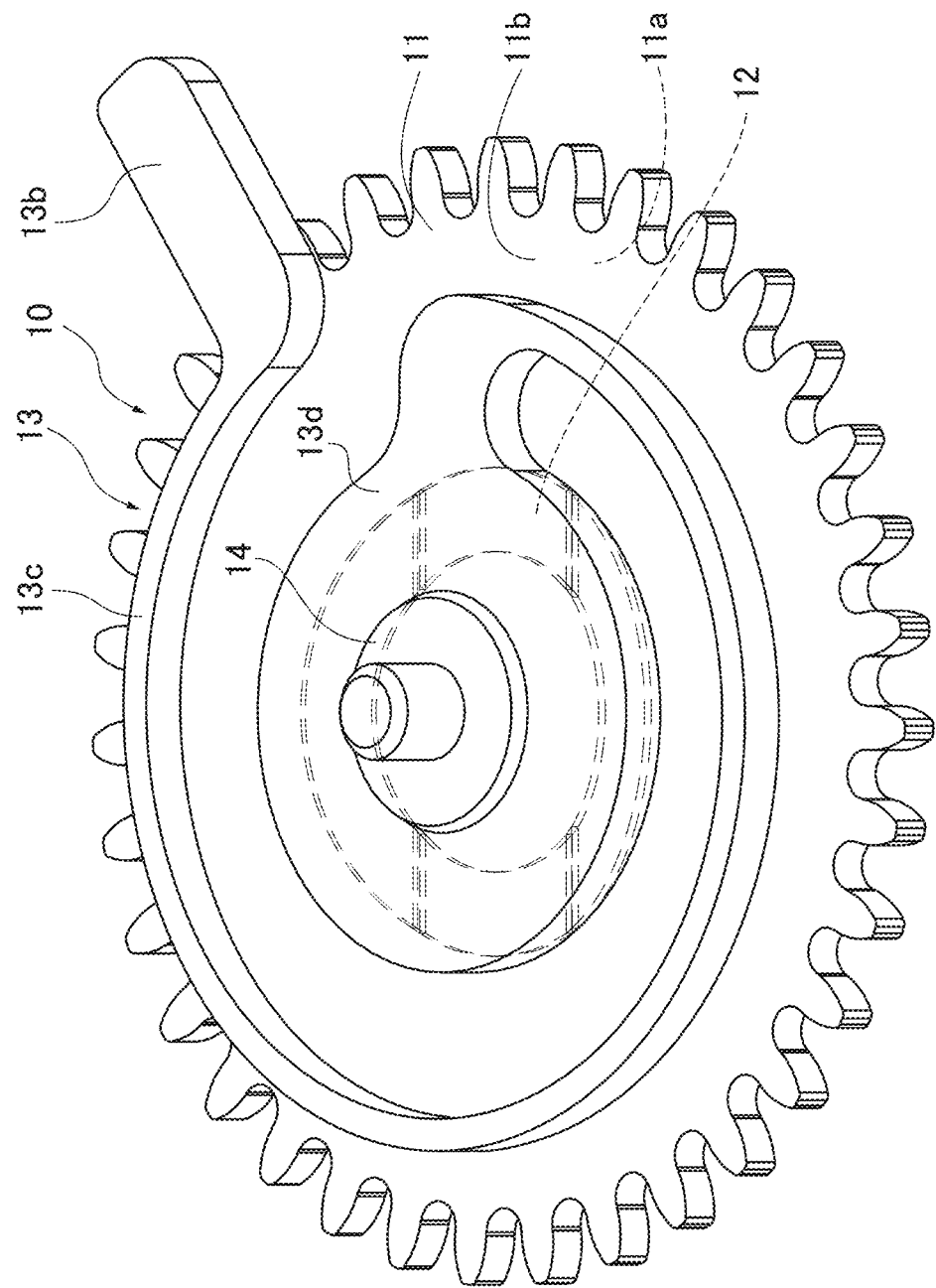
FIG. 8 is a view illustrating a variation reduction mechanism of a modified example in which a slip torque spring is disposed between a return gear and a return spring.
Figure 9:
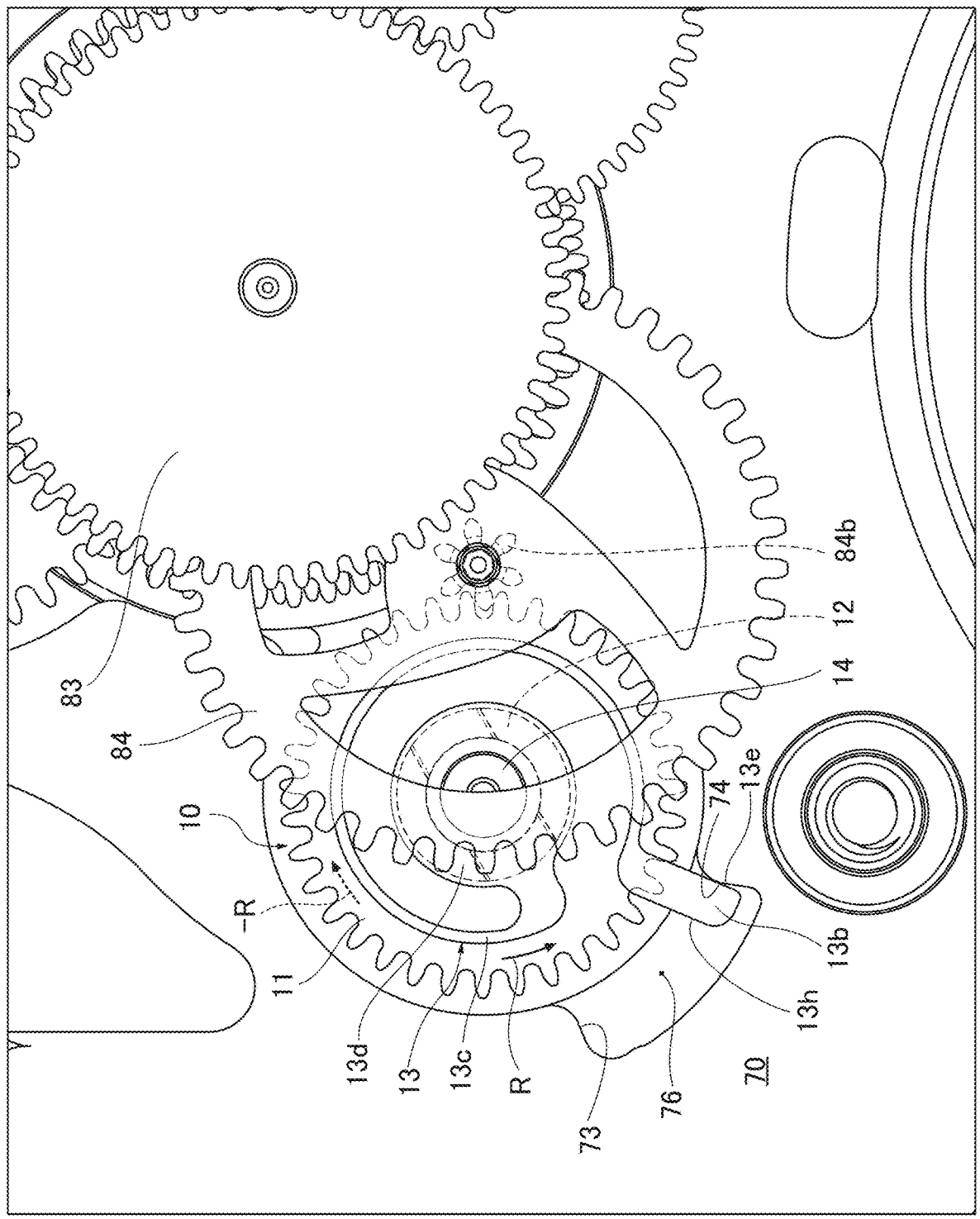
FIG. 9 is a view describing an operation of the variation reduction mechanism illustrated in FIG. 8.

FIG. 8 is a view illustrating the variation reduction mechanism 10 of Modified Example in which the slip torque spring 12 is disposed between the return gear 11 and the return spring 13. FIG. 9 is a view describing the operation of the variation reduction mechanism 10 illustrated in FIG. 8.

The variation reduction mechanism 10 of the stop position of the second hand 96 of Embodiment 1 is configured that the slip torque spring 12 and the return spring 13 are disposed in difference sides of the return gear 11, respectively. However, as illustrated in FIG. 8, a plate spring may be applied as the slip torque spring 12, and this slip torque spring 12 may be disposed between the return gear 11 and the return spring 13. In this case, both of the slip torque spring 12 and the return spring 13 are disposed above the upper surface 11b of the return gear 11.

The slip torque spring 12 illustrated in FIG. 8 is, for example, a disc shaped elastic member. A hole is formed in the center portion of the slip torque spring 12. The stem 14 loosely penetrates through the hole. A part of the slip torque spring is bent upward in the thickness direction. The slip torque spring 12 is sandwiched by the return gear 11 and the base portion 13d of the return spring 13, so that the upwardly bent part of the slip torque spring 12 is elastically deformed to be unbent.

The elastic force is generated in the bent part of the slip torque spring 12, and the normal force by the elastic force is generated between the return gear 11 and the base portion 13d of the return spring 13. A friction force similar to the friction force generated between the return gear 11 and the slip torque spring 12 in Embodiment 1 is thereby generated between the return gear 11 and the return spring 13.

When the slip torque spring 12 is not fixed to the return gear 11, the return spring 13 and the stem 14, or the slip torque spring 12 is fixed to the return gear 11 or the return spring 13 and the stem 14, the slip can be generated between the return gear 11 and the return spring 13.

The variation reduction mechanism 10 illustrated in FIG. 8 does not include the stopper portion 13a, but may include the stopper portion 13a. As described in Embodiment 1, the variation reduction mechanism 10 including the stopper portion 13a controls a change in a magnitude of the friction force which is applied to the rotating return gear 11 to be better than the variation reduction mechanism 10 without the stopper portion 13a.

In the variation reduction mechanism 10 of Modified Example configured as described above, the friction force in the direction opposite to the normal hand movement direction for displaying a time is not applied to the return gear 11 in the initial stage. However, after the return gear 11 rotates in the arrow R direction by the normal hand movement operation for displaying a time, and the side edge 13e of the hook portion 13b contacts the wall 74 of the main plate 70; the spring portion 13c elastically deforms in accordance with the increase in the rotation of the return gear 11, and the friction force in the direction (dashed line arrow—R direction) opposite to the arrow R direction is applied to the return gear 11 from the base end portion of the return spring 13 through the slip torque spring 12. The torque in the direction opposite to the normal hand movement direction for displaying a time is thereby applied to the return gear 11, and the variations in the stop position of the second hand 96 can be thus reduced.

When the rotation of the return gear 11 further increases, the slip occurs between the return spring 13 and the slip torque spring 12 and/or between the slip torque spring 12 and the return gear 11. However, as the torque in the direction opposite to the normal hand movement direction for displaying a time keeps acting on the return gear 11, the variations in the stop position of the second hand 96 can be always reduced during the normal hand movement operation.

When the return gear 11 rotates in the direction (dashed line arrow—R direction) opposite to the normal hand movement direction, the return spring 13 rotates together with the return gear 11 through the slip torque spring 12. However, when the opposite side edge 13h of the hook portion 13b contacts the wall 73 defining the space 76, the slip occurs between the return spring 13 and the slip torque spring 12 and/or between the slip torque spring 12 and the return gear 11. Thus, only the return gear 11 keeps rotating, and the slip torque spring 12, the stem 14, and the return spring 13 merely receive the friction force from the return gear 11 through the projection 12b, and are not damaged.

The friction member (slip torque spring 12 in Embodiment 1 and Modified Example) in the variation reduction mechanism according to the present disclosure is not limited to the configuration of the above-described slip torque spring 12. Any configuration can be applied as long as it applies the friction force to the driving of the return gear by the contact to the return gear, and generates the slips between the return gear and the spring member when a constant torque or more is applied.

Embodiment 2: Configuration of Variation Reduction Mechanism

Figure 10:
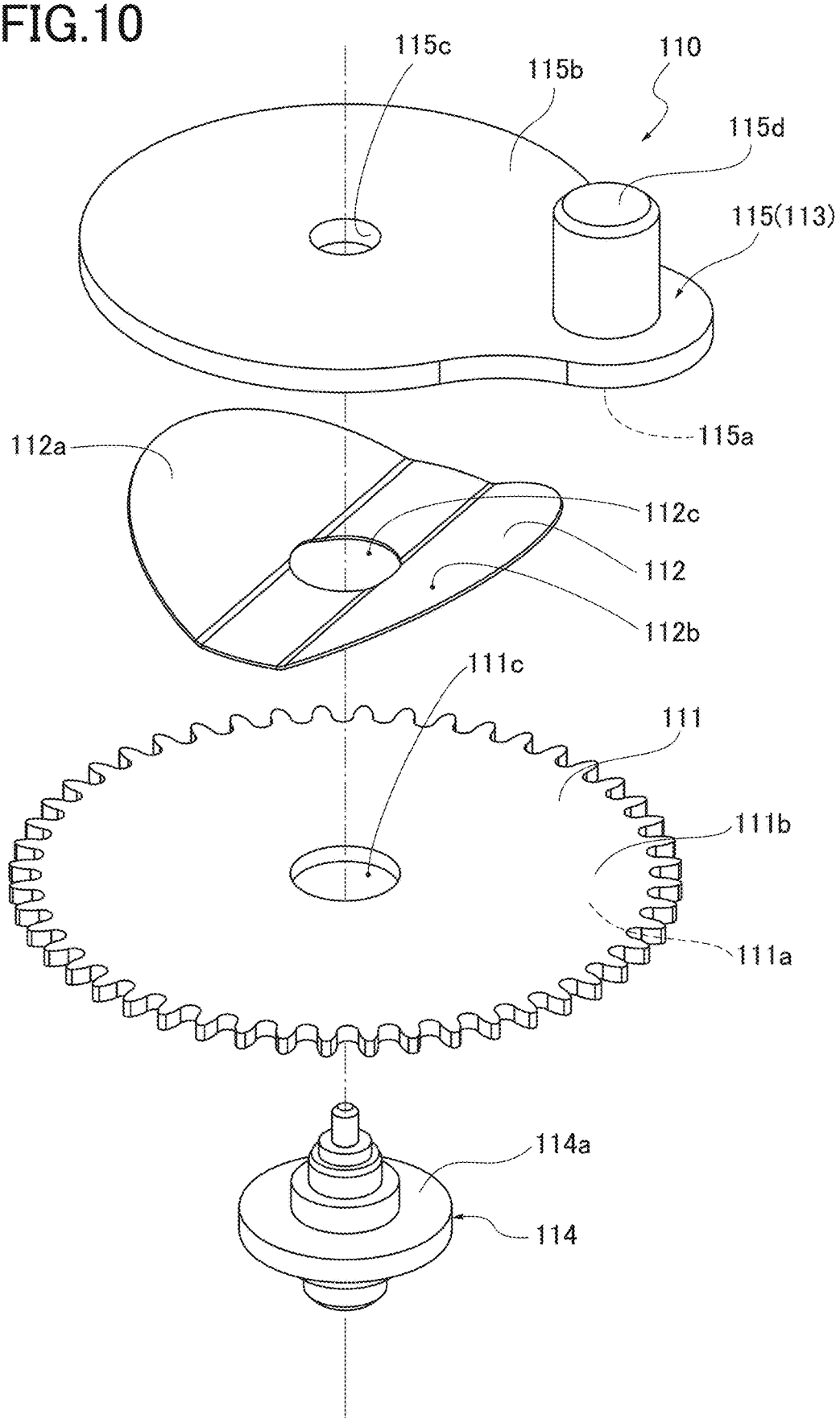
FIG. 10 is an exploded perspective view illustrating a return gear, a slip torque spring, a return wheel plate, and a stem which are components of a variation reduction mechanism of a stop position of a pointer as a second embodiment (Embodiment 2) of the present disclosure.
Figure 11:
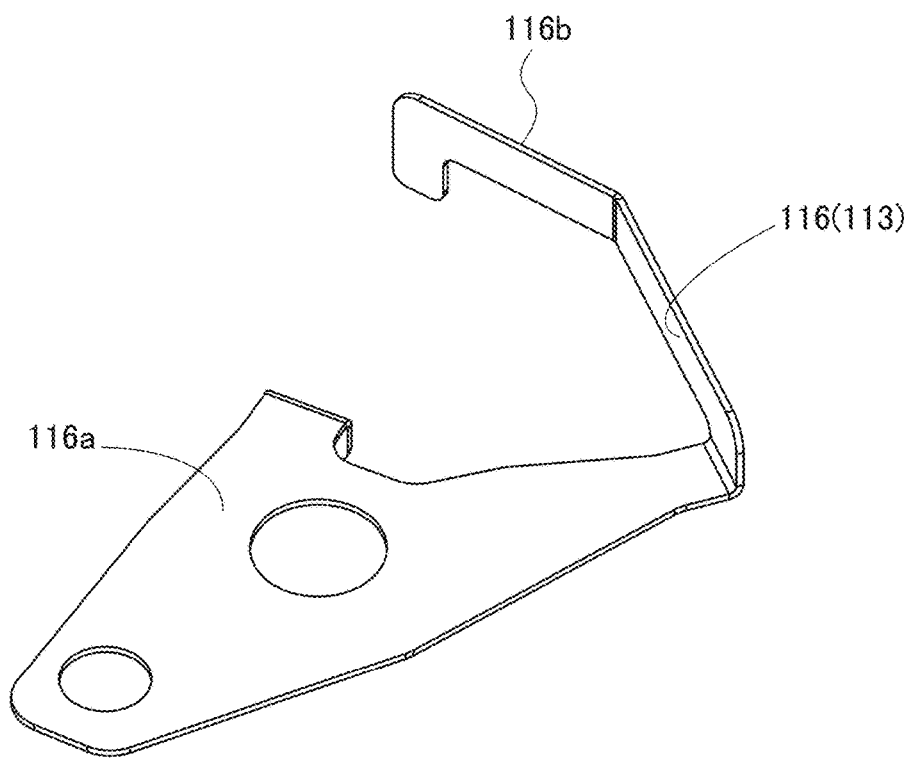
FIG. 11 is a perspective view illustrating a plate spring of the variation reduction mechanism.
Figure 12:
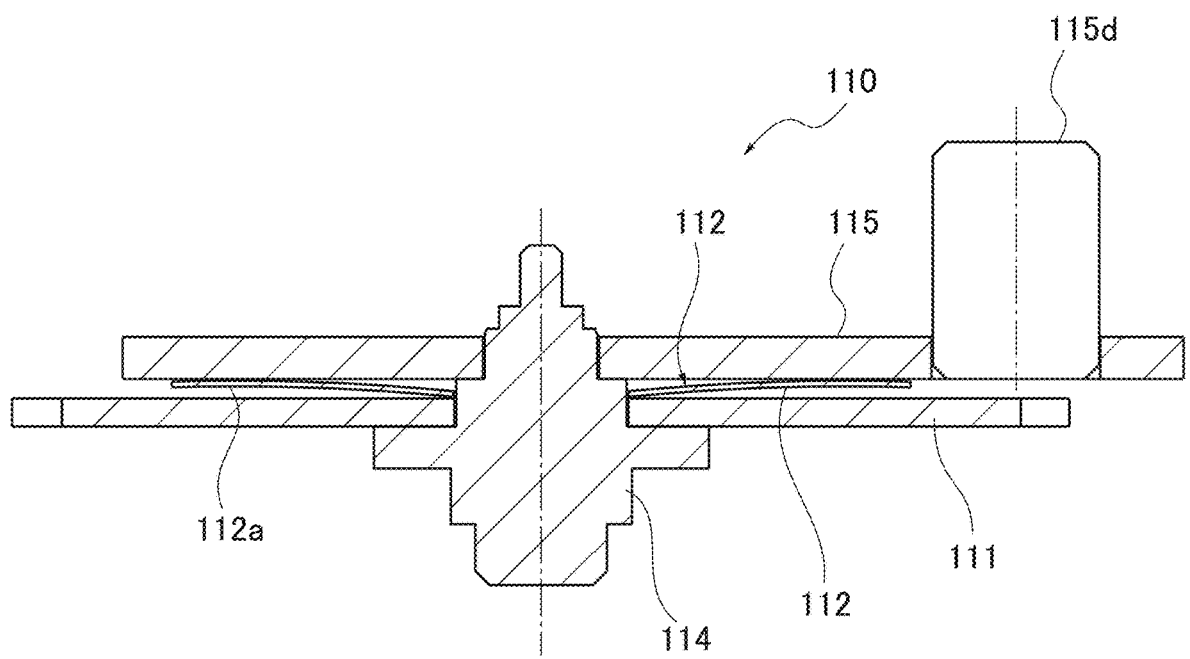
FIG. 12 is a cross section view of an assembly of the return gear, the slip torque spring, the return wheel plate, and the stem in FIG. 10.
Figure 13:
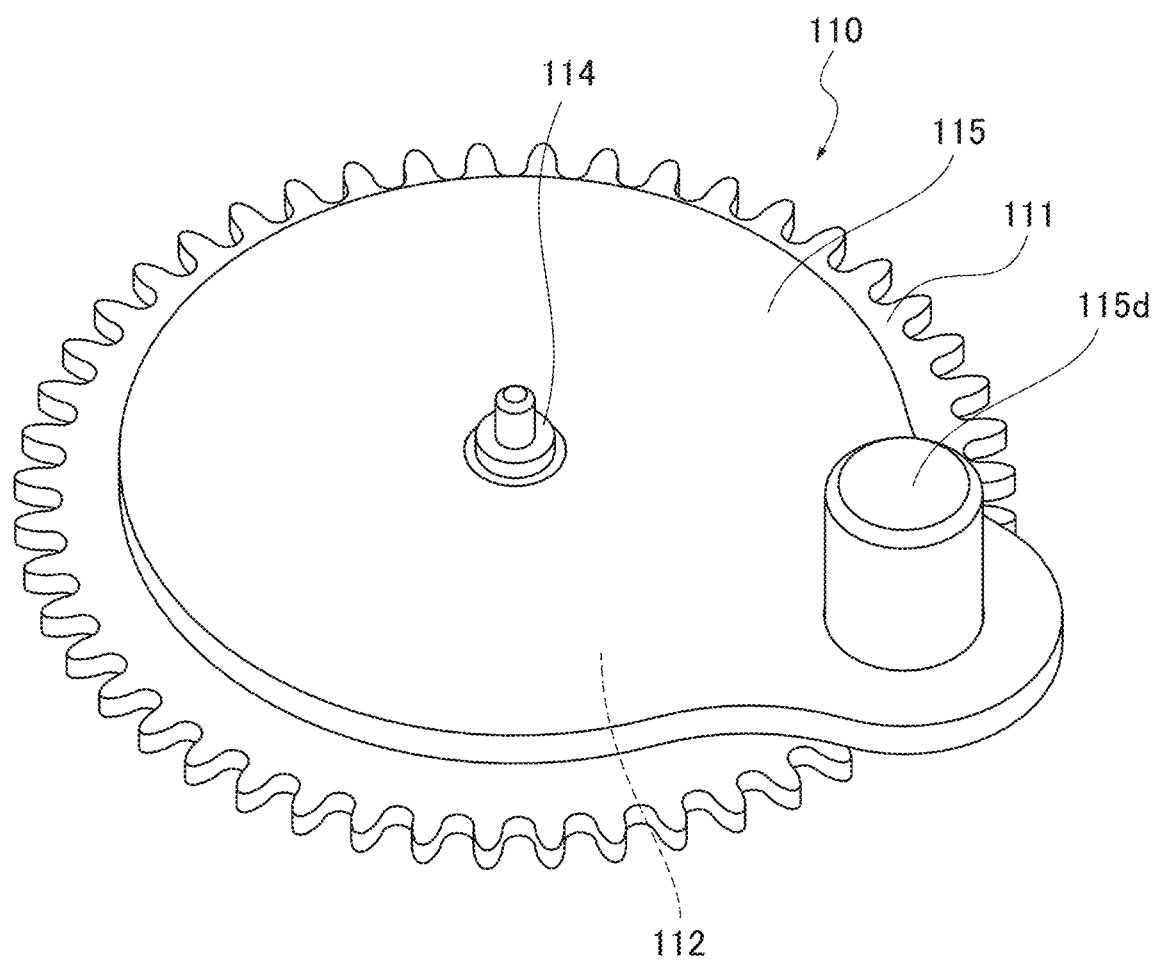
FIG. 13 is a perspective view of the assembly of the return gear, the slip torque spring, the return wheel plate, and the stem.

FIG. 10 is an exploded perspective view illustrating a return gear 111, a slip torque spring 112, a return wheel plate 115, and a stem 114 as components of a variation reduction mechanism 110 of a stop position of a pointer (second hand 96 as one example) of a second embodiment (Embodiment 2) according to the present disclosure. FIG. 11 is a perspective view illustrating a plate spring 116 as a component of the variation reduction mechanism 110. FIG. 12 is a cross section view of an assembly of the return gear 111, the slip torque spring 112, the return wheel plate 115, and the stem 114 in FIG. 10. FIG. 13 is a perspective view of the assembly of the return gear 111, the slip torque spring 112, the return wheel plate 115, and the stem 114.

The variation reduction mechanism 110 of the second embodiment (Embodiment 2) according to the present disclosure includes the return gear 111 (one example of return gear), the slip torque spring 112 (one example of friction member), the stem 114, and the return spring member 113 (one example of return spring member). The return spring member 113 includes the return wheel plate 115 (one example of fixed member of return spring member) and the plate spring 116 (one example of spring member of return spring member).

The return gear 111 of the variation reduction mechanism 110 corresponds to the return gear 11, the slip torque spring 112 corresponds to the slip torque spring 12, the stem 114 corresponds to the stem 14, and the return spring member 113 corresponds to the return spring 13 in the variation reduction mechanism 10 of Embodiment 1. The return wheel plate 115 corresponds to the base portion 13d of the return spring 13, and the plate spring 116 corresponds to the spring portion 13c.

Similar to the variation reduction mechanism 10, the variation reduction mechanism 110 engages with the pinion 84b of the third wheel 84 to reduce the variations in the second hand 96. As illustrated in FIGS. 10, 11, the variation reduction mechanism 110 includes the return gear 111, the slip torque spring 112, the return wheel plate 115, the stem 114, and the plate spring 116. The return gear 111, the slip torque spring 112, the return wheel plate 115, and the stem 114 are assembled to be integrated as illustrated in FIGS. 12, 13. On the other hand, the plate spring 116 is incorporated into the main plate 70 in the movement of the timepiece into which the variation reduction mechanism 110 is incorporated.

The return gear 111 engages with the pinion 84b of the third wheel 84, similar to the return gear 11. A hole 111c is formed in the center of the return gear 111. The stem 114 is inserted into the hole 111c from a lower surface 111a. The stem 114 loosely penetrates through the hole 111c. The return gear 111 is thereby independently rotatable relative to the stem 114. The stem 114 includes a retainer 114a having a diameter larger than that of the hole 111c of the return gear 111. The retainer 114a contacts the lower surface 111a of the return gear 111.

The slip torque spring 112 is a disc shaped elastic member, and is made of a material. A part of the slip torque spring 112 is bent upward in the thickness direction. This slip torque spring 112 is the same as the slip torque spring 12 illustrated in FIGS. 8, 9. A hole 112c is formed in the center of the slip torque spring 112.

The slip torque spring 112 is disposed above an upper surface 111b of the return gear 111 to overlap with the return gear 111. The stem 114 is inserted into the hole 112c of the slip torque spring 112 from the lower surface. The stem 114 loosely penetrates through the hole 112c. The slip torque spring 112 is thereby independently rotatable relative to the stem 114.

A hole 115c is formed in the center of the return wheel plate 115. The return wheel plate 115 is disposed above the upper surface 111b of the return gear 11 to overlap with the slip torque spring 112. The return wheel plate 115 and the return gear 111 sandwich therebetween the slip torque spring 112. The return wheel plate 115 includes a short cylindrical return wheel pin 115d (one example of regulation member) which projects upward opposite to a lower surface 115a that the slip torque spring 112 contacts.

The stem 114 is inserted into the hole 115c of the return wheel plate 115 from the lower surface 115a. The stem 114 is fitted into the hole 115c, and the return wheel plate 115 is fixed to the stem 114. At this point, the return wheel plate 115 is fixed to the stem 114 such that the bent portions 112a, 112b of the slip torque spring 112 are elastically deformed to be unbent as illustrated in FIG. 12. The elastic force is generated in the deformed portion of the slip torque spring 112, the normal force by the elastic force is generated between the return gear 111 and the return wheel plate 115, and the friction force described in Embodiment 1 is also generated between the return gear 111 and the return wheel plate 115.

Figure 14:
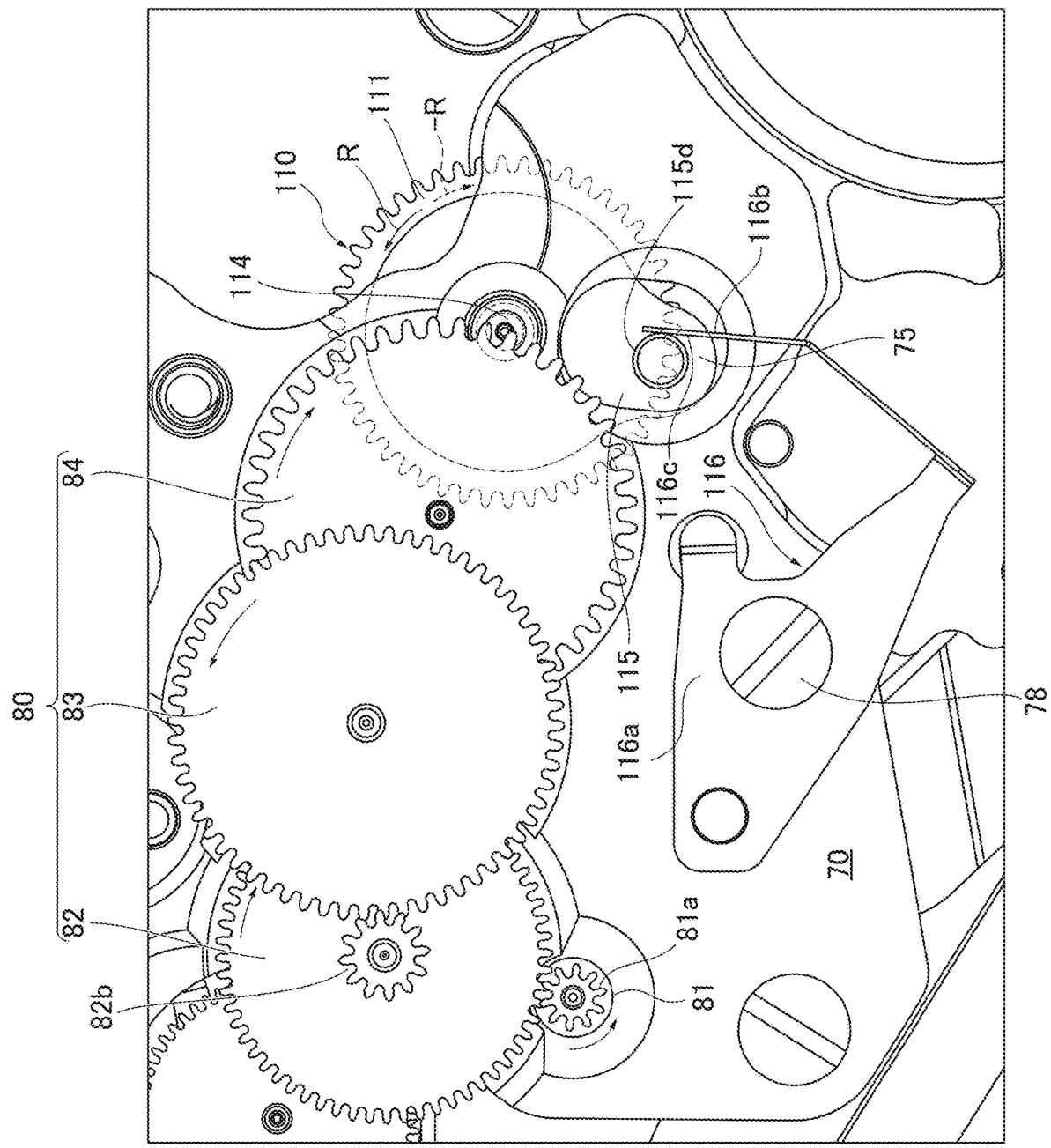
FIG. 14 is a view describing an operation of the variation reduction mechanism of the stop position of the pointer of Embodiment 2, and illustrating that the variation reduction mechanism is incorporated into the movement and a return wheel pin contacts the plate spring of a return spring mechanism.
Figure 15:
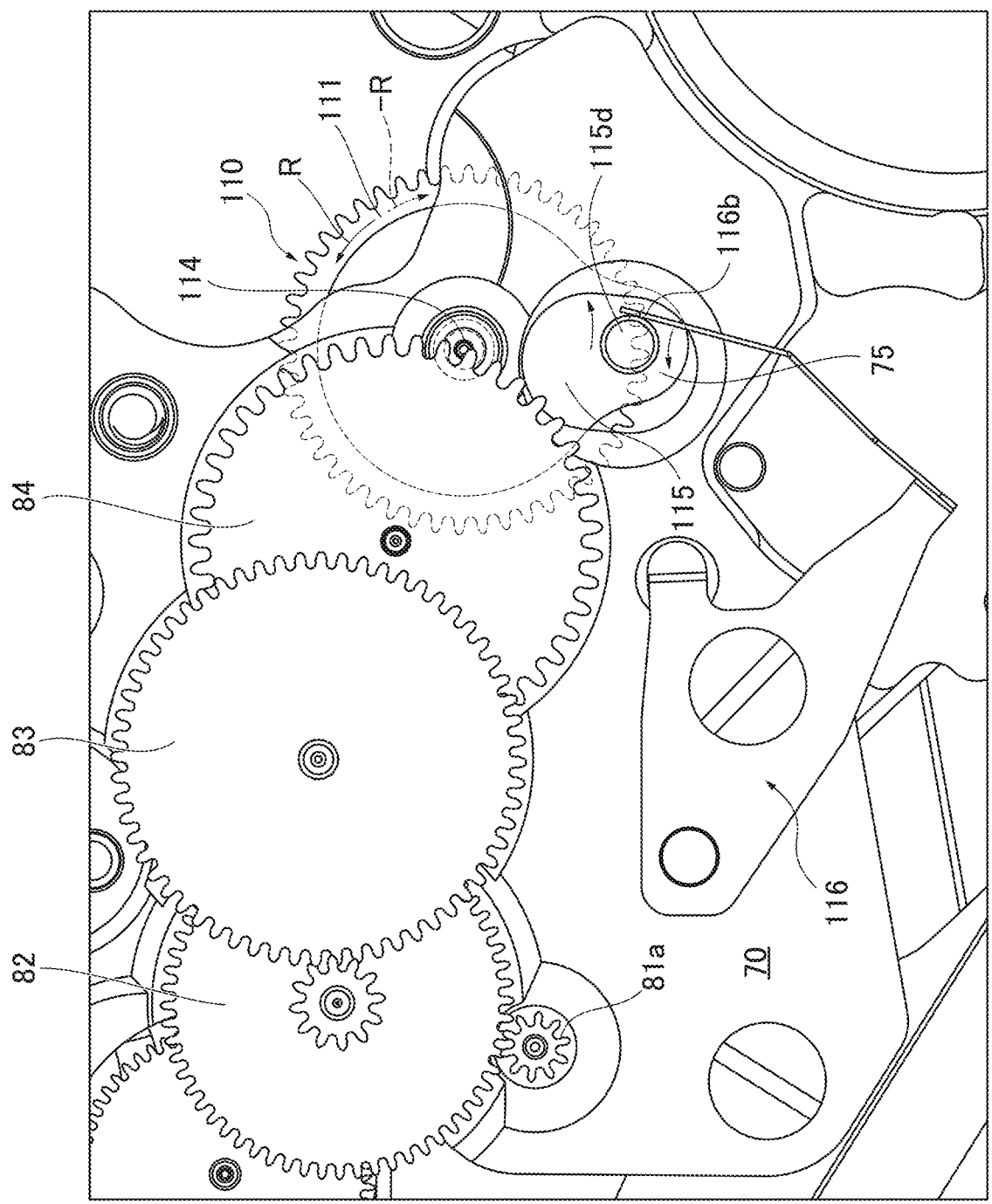
FIG. 15 is a view describing the operation of the variation reduction mechanism, and illustrating that the variation reduction mechanism is incorporated into the movement and a torque by an elastic force of the spring portion acts on the return wheel pin.
Figure 16:
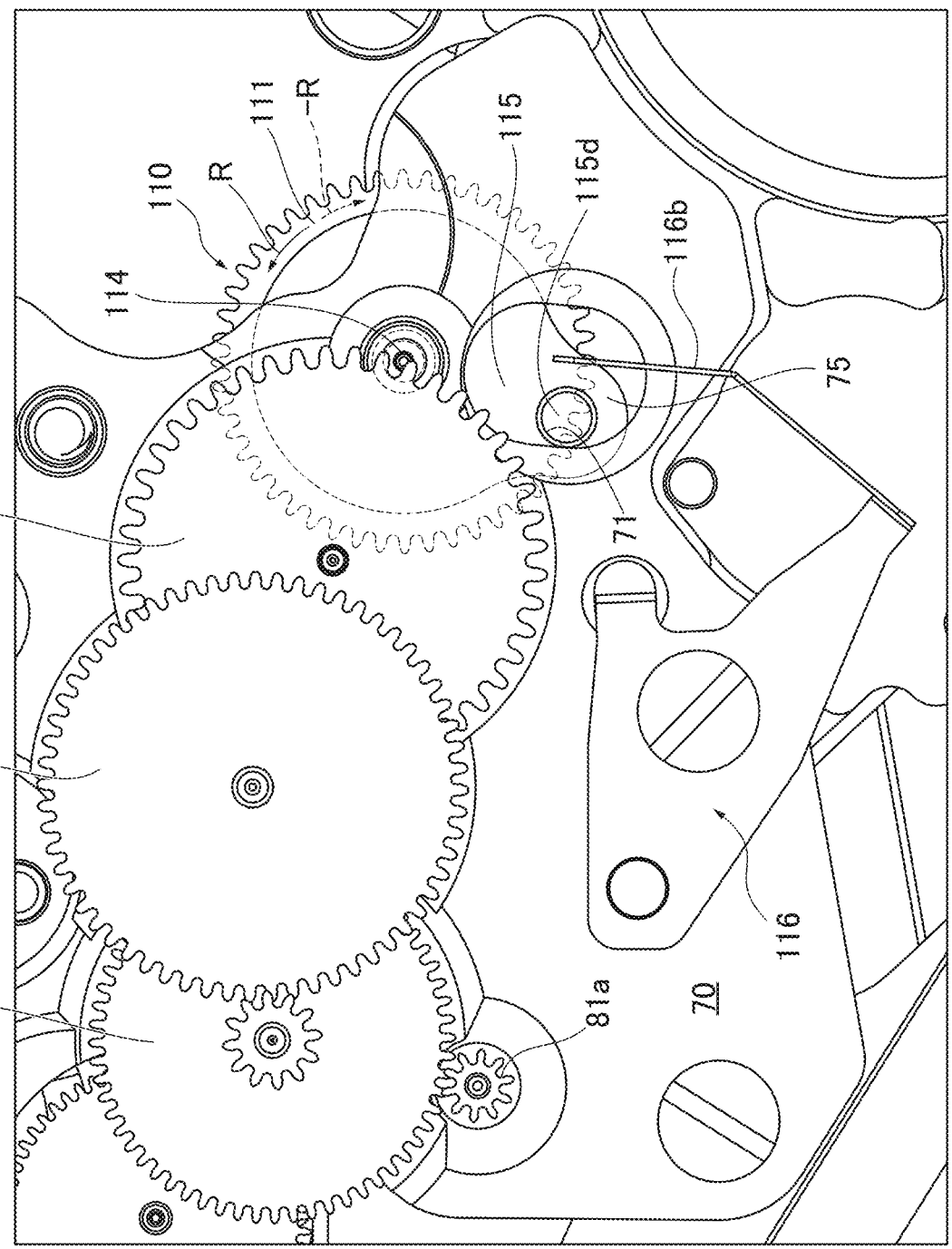
FIG. 16 is a view describing the operation of the variation reduction mechanism, and illustrating that the variation reduction mechanism is incorporated into the movement and the gear train mechanism rotates in the direction opposite to the normal hand movement direction.

FIG. 14 is a view describing the operation of the variation reduction mechanism 10 of Embodiment 2, and illustrating that the variation reduction mechanism 110 is incorporated into the movement, and the return wheel pin 115d contacts the plate spring 116 of the return spring member 113. FIG. 15 is a view describing the operation of the variation reduction mechanism 10, and illustrating that the variation reduction mechanism 10 is incorporated into the movement, and the torque by the elastic force of the plate spring 116 acts on the return wheel pin 115d. FIG. 16 is a view describing the operation of the variation reduction mechanism 110, and illustrating that the variation reduction mechanism 110 is incorporated into the movement, and the gear train mechanism 80 rotates in the direction opposite to the normal hand movement direction.

As illustrated in FIG. 11, the plate spring 116 includes a plate fixed portion 116a and a spring portion 116b elongating like an arm from the fixed portion 116a. As illustrated in FIG. 14, the fixed portion 116a is fixed to the main plate 70 of the movement of the timepiece by a screw 78, for example. The variation reduction mechanism 110 is incorporated into the movement of the timepiece.

The spring portion 116b is made of an elastic deformable material. A base end of the spring portion 116b is connected to the fixed portion 116a, and a free end of the spring portion 116b contacts an outer circumference surface of the return wheel pin 115d of the variation reduction mechanism 110 incorporated in to the movement. In the figure, the free end of the spring portion 116b contacts the return wheel pin 115d from the right side of the figure.

When the return wheel plate 115 rotates in the left rotation direction (counterclockwise direction) in the figure, and the return wheel pin 115d is moved in the right direction in the figure, the free end of the spring portion 116b of the plate spring 116 is pressed by the return wheel pin 115d to be displaced in the right direction. On the other hand, as the fixed base end of the spring portion 116b is not displaced, the spring portion 116b of the plate spring 116 is elastically deformed. With this elastic deformation, the restoring force (elastic force) by the elastic deformation, which moves the free end of the spring portion to the original position, is generated in the spring portion 116b.

The return wheel plate 115 and the plate spring 116 constitute the return spring member 113. The return spring member 113 operates similar to the return spring 13 in Embodiment 1.

Operation of Variation Reduction Mechanism

Next, the operation of the variation reduction mechanism 110 configured as described above will be described. FIGS. 15, 16 are views describing the operation of the variation reduction mechanism 110. FIG. 15 is a view illustrating that the variation reduction mechanism 110 is incorporated into the movement, and the torque by the elastic force acts on the return wheel pin 115d. FIG. 16 is a view illustrating that the variation reduction mechanism 110 is incorporated into the movement, and the gear train mechanism 80 rotates in the direction opposite to the normal hand movement direction.

As illustrated in FIG. 14, when the variation reduction mechanism 110 is incorporated into the movement, the torque in the normal hand movement direction for displaying a time is transferred from the third wheel 84 to the return gear 111. The rotation direction by the torque is the arrow R direction (counterclockwise direction in FIG. 14).

When the return gear 111 rotates in the arrow R direction from the position in FIG. 14, the slip torque spring 112 in FIGS. 10, 12 disposed on the upper surface 111b of the return gear 111 starts rotating in the arrow R direction together with the return gear 111 by the friction force due to the normal force acting between the slip torque spring 112 and the return gear 111.

The return wheel plate 115 of the return spring member 113 starts rotating in the arrow R direction together with the slip torque spring 112 by the friction force due to the normal force acting between the return wheel plate 115 and the slip torque spring 112.

At this time, the return wheel pin 115d is displaced in the right direction by the rotation of the return wheel plate 115 as illustrated in FIG. 15, and the spring portion 116b of the plate spring 116 starts being elastically deformed. The elastic force of the spring portion 116b is applied to the return wheel pin 115d, and the torque in the direction (dashed line arrow—R direction) opposite to the normal hand movement direction (arrow R direction) is applied to the return wheel plate 115.

The return wheel plate 115 contacts the slip torque spring 112 by the friction force, and the slip torque spring 112 contacts the return gear 111 by the friction force. Thus, the torque applied to the return wheel plate 115 is applied to the return gear 111.

As the direction of the torque by the elastic force, which is received by the return gear 111 from the slip torque spring 112, corresponds to the direction (dashed line arrow—R direction) opposite to the arrow R direction, the return gear 111 applies the torque in the direction opposite to the normal hand movement direction for displaying a time to the third wheel 84 with which the teeth of the return gear 11 engage.

The torque in the direction opposite to the normal hand movement direction for displaying a time is therefore applied to the fourth wheel 83 and the fifth wheel 82 in the upstream of the third wheel 84 in the driving force transferring direction. The teeth of the third wheel 84, the fourth wheel 83, and the fifth wheel 82 are pressed against each other in the one side of the backlash. The variations in the stop position of the second hand 96 fixed to the fourth wheel 83 caused by the backlash is prevented or controlled in the normal hand movement operation for displaying a time.

When the torque applied to the return wheel plate 115 by the elastic force of the spring portion 116b exceeds the torque by the friction force due to the normal force between the return wheel plate 115 and the slip torque spring 112 or the torque by the friction force due to the normal force between the slip torque spring 112 and the return gear 111, the slip occurs between the return gear 111 rotating in the normal hand movement direction and the return wheel plate 115 to which the elastic force in the direction opposite to the normal hand movement direction is applied (between return wheel plate 115 and slip torque spring 112 and/or between slip torque spring 112 and return gear 111). After that, the return gear 111 keeps rotating in the arrow R direction while receiving a constant friction force (dynamic friction force) from the slip torque spring 112.

During this period, the return gear 111 rotates in the arrow R direction by the hand movement operation. After the slip occurs between the return wheel plate 115 and the slip torque spring 112 and/or between the slip torque spring 112 and the return gear 111, the rotation torque in the dashed line arrow—R direction is applied to the return wheel plate 115 by the reaction force from the spring portion 116b.

The rotation torque applied to the return wheel plate 115 is transferred to the return gear 111 through the slip torque spring 112, and the rotation torque (load torque) in the direction opposite to the normal hand movement direction is transferred to the wheels (fourth wheel 83, fifth wheel 82, and rotor 81) before the third wheel 84 engaging with the return gear 111. The amount of the backlash between the respective wheels (fourth wheel 83, fifth wheel 82, and rotor 81) before the third wheel 84 is thereby reduced, so that the fluctuation of the second hand 96 is controlled, and the variations in the stop position of the second hand 96 fixed to the fourth wheel 83 are reduced (prevented or controlled).

In the timepiece, when a time is corrected by rotating the rotor 81 in the direction opposite to the normal hand movement direction, the torque in the direction opposite to the normal hand movement direction is applied to the return gear 111 from the third wheel 84, and the return gear 111 rotates in the dashed line arrow—R direction (clockwise direction in FIG. 16) from the position in FIG. 15 to the position in FIG. 16. In this case, the torque in the direction which releases the elastic force of the spring portion 13c is applied to the return gear 111 through the slip torque spring 112. As illustrated in FIG. 16, when the outer circumference surface of the return wheel pin 115d separates from the spring portion 116b and the left side of the outer circumference surface of the return wheel pin 115d contacts the wall 71 of the main plate 70, the return wheel plate 115 stops rotating.

At this time, the slip occurs between the return wheel plate 115 and the slip torque spring 112 or between the slip torque spring 112 and the return gear 111. Accordingly, only the return gear 111 or both of the return gear 111 and the slip torque spring 112 keeps/keep rotating, and the return spring member 113 including the return wheel plate 115 and the plate spring 116 merely receives the friction force from the slip torque spring 112 and is not damaged.

As described above, according to the variation reduction mechanism 110 of the stop position of the second hand 96 of the present embodiment, the teeth of the gears are always pressed against each other in the end portion within the backlash in the direction opposite to the normal hand movement direction in the rotation in the normal hand movement direction, so that the fluctuation of the second hand 96 and the variations in the stop position of the second hand 96 can be prevented and controlled to be reduced without damage when the torque in the direction opposite to the normal hand movement direction for displaying a time is applied.

Moreover, in the variation reduction mechanism 110 of the stop position of the second hand 96 of the present embodiment, the return spring member 113 is divided into the plate spring 116 and the return wheel plate 115 fixed to the stem 114. The plate spring 116 can be thereby disposed in the movement, and the freedom degree of disposing the variation reduction mechanism 110 can be improved.

Modified Example 1

Figure 17:
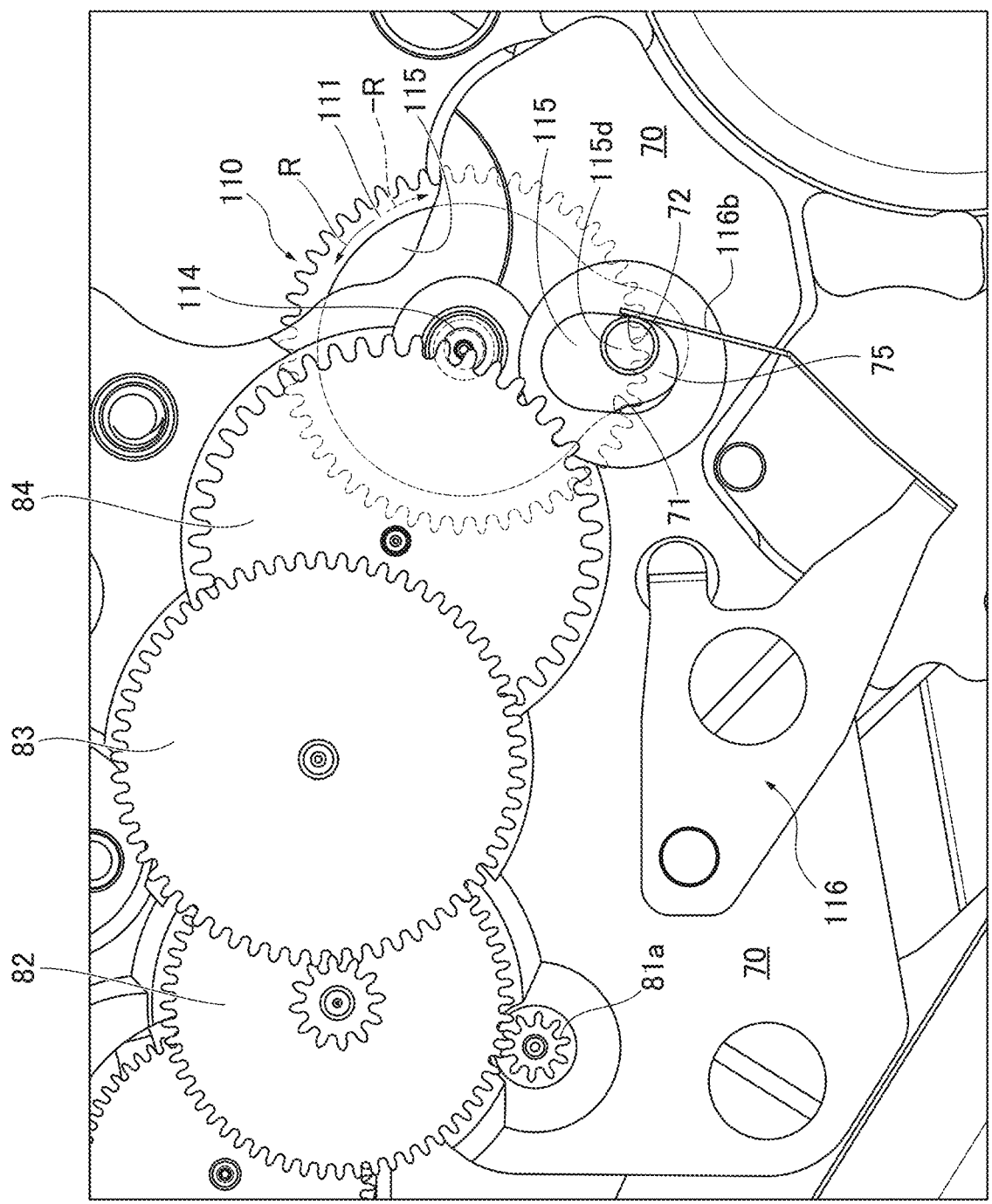
FIG. 17 is a view illustrating a modified example in which a rotation range of a return wheel plate is reduced to be smaller than that in the mechanism of Embodiment 2 illustrated in FIGS. 14 to 16, and the return wheel pin contacts a wall of a main plate (forward wall in hand movement direction) during the operation in the normal hand movement direction.
Figure 18:
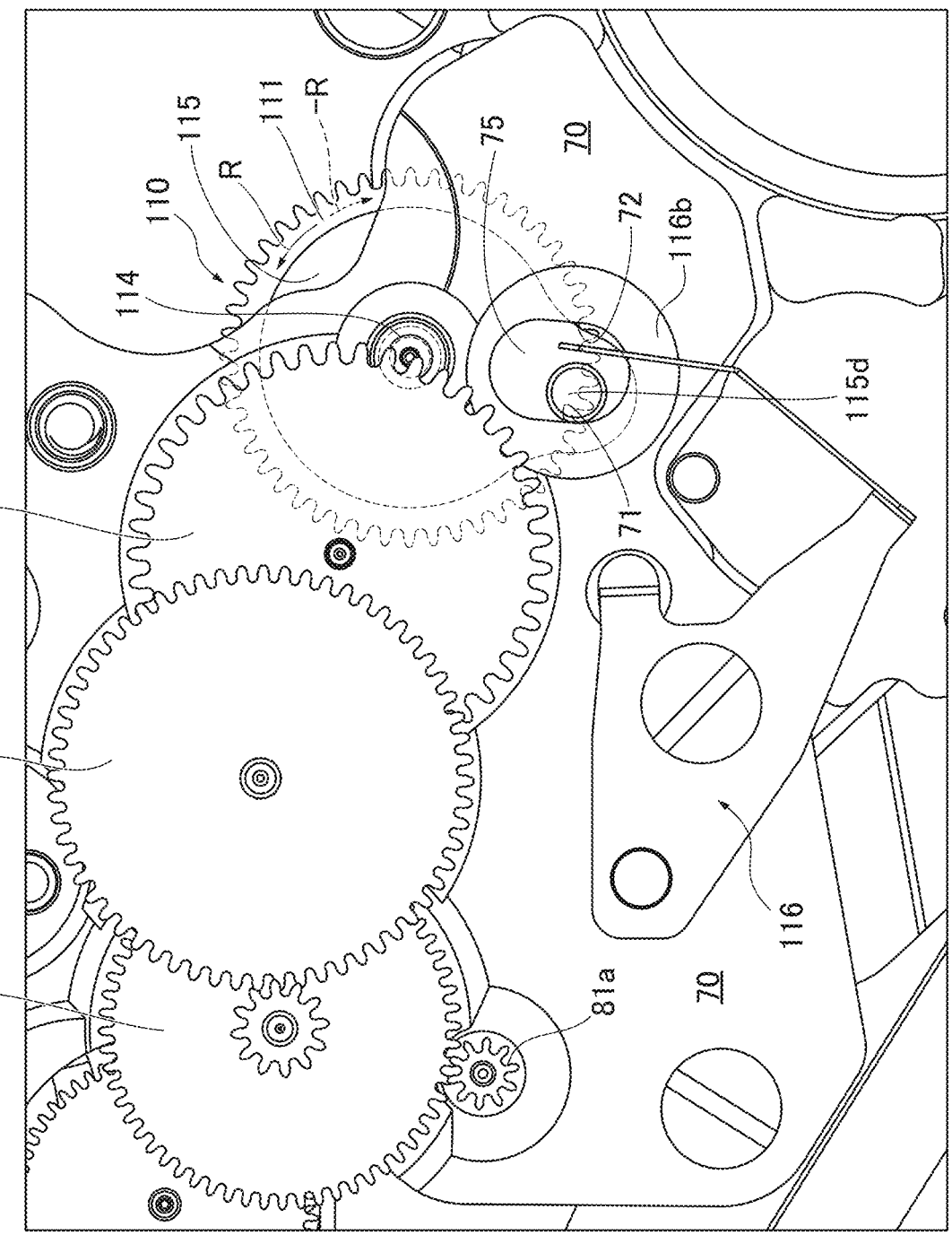
FIG. 18 is a view illustrating the modified example in which the rotation range of the return wheel plate is reduced to be smaller than that in the mechanism of Embodiment 2 illustrated in FIGS. 14 to 16, and the return wheel pin contacts an opposite wall of the main plate (backward wall in hand movement direction) during the operation in the direction opposite to the normal hand movement direction.

FIGS. 17, 18 are views illustrating the variation reduction mechanism 110 of Modified Example 1 in which the rotation range of the return wheel plate 115 is smaller than that of the variation reduction mechanism 110 of Embodiment 2 illustrated in FIGS. 14 to 16. FIG. 17 is a view illustrating that the return wheel pin 115d contacts the wall 72 (forward wall in hand movement direction) of the main plate 70 during the operation in the normal hand movement direction. FIG. 18 is a view illustrating that the return wheel pin 115d contacts the opposite wall 71 (backward wall in hand movement direction) of the main plate 70 during the operation in the direction opposite to the normal hand movement direction.

In the illustrated variation reduction mechanism 110, in order to narrow the rotation range within which the return wheel pin 115d of the return wheel plate 115 can move, a window (space) 75 from which the return wheel pin 115d projects is downsized to be smaller than the window 75 in the variation reduction mechanism 110 illustrated in FIGS. 14 to 16. The window 75 is provided in the main plate 70 in the movement of the timepiece into which the variation reduction mechanism 110 is incorporated. Instead of downsizing the window 75, the diameter of the return wheel pin 115d may be increased. Namely, the diameter of the return wheel pin 115d relative to the diameter of the window 75 may be increased.

According to the variation reduction mechanism 110 configured as described above, the elastic deformation of the spring portion 116b is regulated within the rotation range of the return wheel pin 115d. The return wheel pin 115d contacts the wall 72 of the window 75 before the torque in the direction opposite to the normal hand movement direction, which is generated in the return wheel plate 115 by the elastic force according to the elastic deformation, exceeds the torque by the friction force between the return gear 111 and the return wheel plate 115 (smaller friction force between friction force generated between return gear 111 and slip torque spring 112 and friction force generated between slip torque spring 112 and return wheel plate 115).

Accordingly, the torque by the elastic force does not exceed the torque by the friction force between the return gear 111 and the return wheel plate 115, and the torque by the constant elastic force according to the elastic deformation of the spring portion 116b when the return wheel pin 115d contacts the wall 72 of the window 75 keep acting on the return gear 111.

On the other hand, when the window 75 is large as illustrated in FIG. 14, and the torque by the elastic force of the spring portion 116b exceeds the torque by the friction force between the return gear 111 and the return wheel plate 115 before the return wheel pin 115d contacts the wall 72, the return wheel plate 115 rapidly slips to the return gear 111 at the exceeding, and the torque in the opposite direction, which is applied to the return gear 111, may significantly change.

As described above, when the size of the return wheel pin 115d relative to the size of the window 75 is increased, and the return wheel pin 115d contacts the wall 72 of the window 75 before the torque by the elastic force exceeds the torque by the friction force between the return gear 111 and the return wheel plate 115, the constant torque in the opposite direction, which is applied to the return gear 111, can be maintained.

By increasing the size of the return wheel pin 115d relative to the size of the window 75, the displacement after the return wheel pin 115d separates from the spring portion 116b can be reduced even when the return gear 111 rotates in the opposite direction (dashed line arrow—R direction) as illustrated in FIG. 18.

The rotation displacement of the return wheel plate 115 until the return wheel pin 115d starts contacting the spring portion 116b can be thereby reduced when the return gear 11 starts re-rotating in the normal hand movement direction. Accordingly, the time until the torque in the opposite direction by the elastic force starts acting on the return gear 111 from the start of the re-rotation in the normal hand movement direction can be reduced.

Modified Example 2

Figure 19:
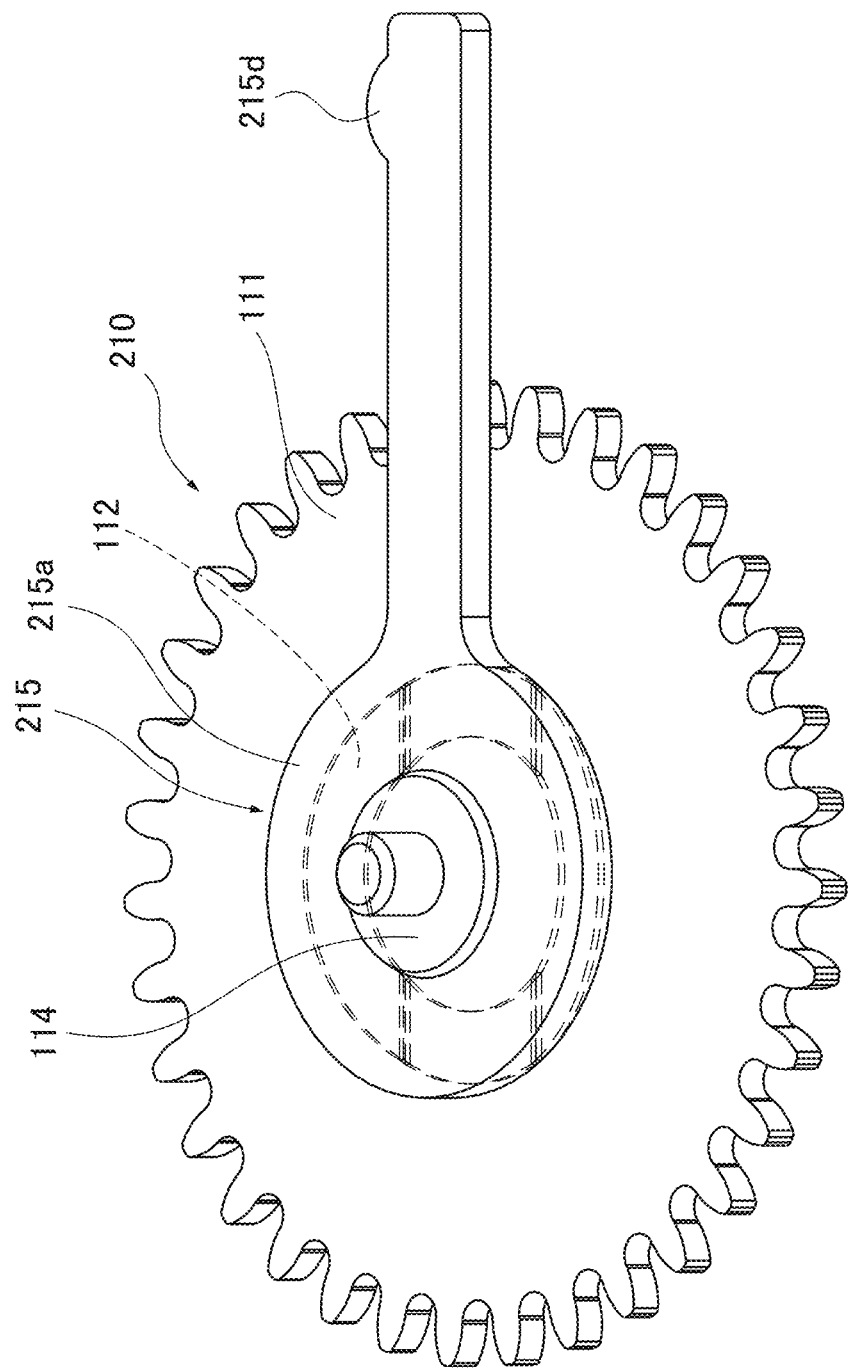
FIG. 19 is a perspective view illustrating a return wheel plate including a return wheel lever which is provided instated of the return wheel plate in the variation reduction mechanism of Embodiment 2.
Figure 20:
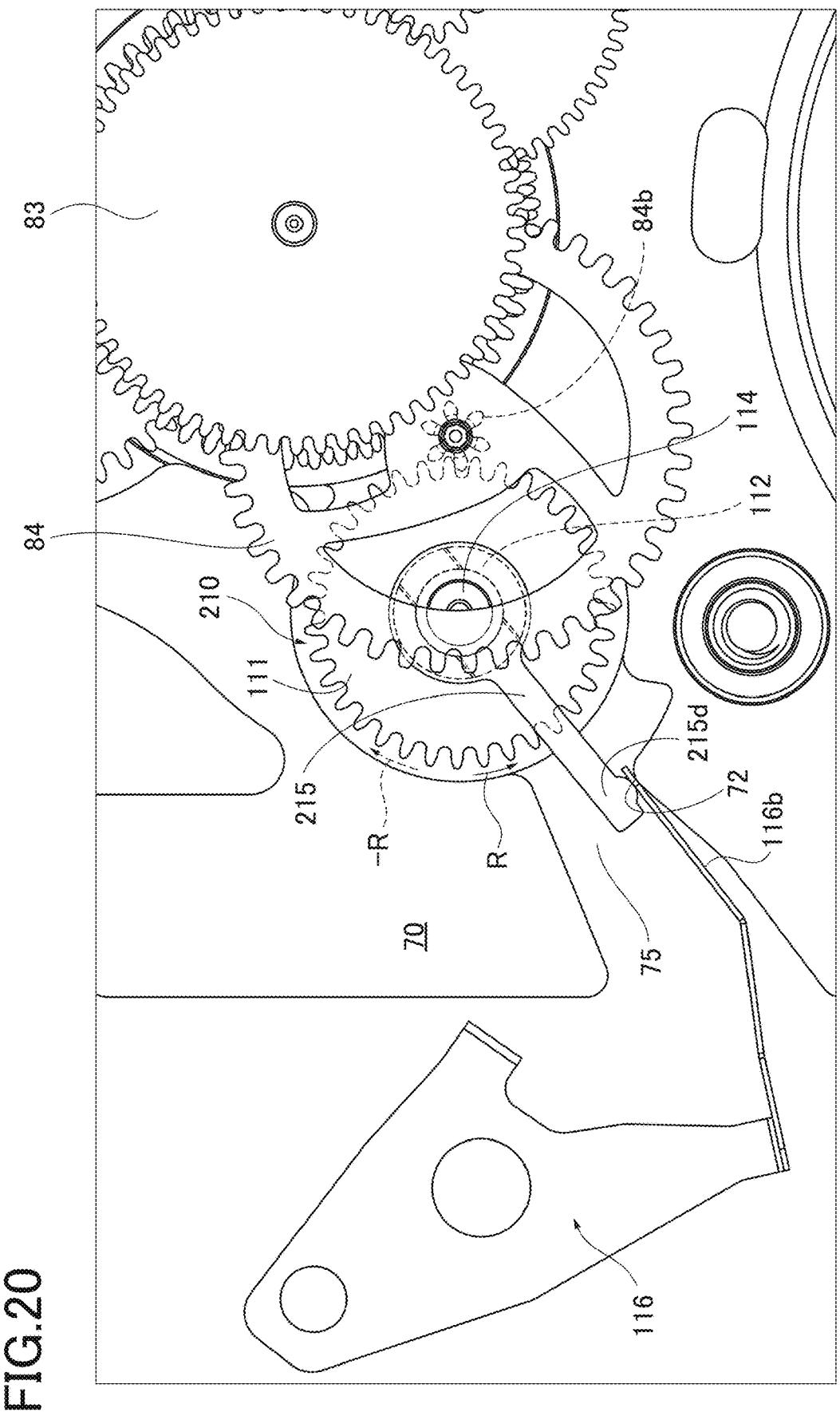
FIG. 20 is a view illustrating the operation of the variation reduction mechanism of Modified Example 2 including the retune wheel plate.

FIG. 19 is a perspective view illustrating a return wheel plate 215 including a return wheel lever 215d which is provided instead of the return wheel plate 115 in the variation reduction mechanism 110 of Embodiment 2. FIG. 20 is a view describing the operation of the variation reduction mechanism 210 of the stop position of the pointer (second hand 96 as one example) in Modified Example 2 including the return wheel plate 215.

The variation reduction mechanisms 110 of Embodiment 2 and Modified Example 1 are configured that the return wheel pin 115d is provided in the return wheel plate 115. However, the spring portion 116b may be elastically deformed by another regulation member instead of the return wheel pin 115d. For example, in the variation reduction mechanism 210 (Modified Example 2), the return wheel plate 215 illustrated in FIG. 19 may be used instead of the return wheel plate 115 of the variation reduction mechanism 110.

In the return wheel plate 215 illustrated in FIG. 19, a plate main portion 215a contacting the slip torque spring 112 is formed to be smaller than the return wheel plate 115 illustrated in FIG. 10, and the return wheel lever 215d (one example of regulation member) extends outward the outer circumference edge of the return gear 111 in the radial direction from the main portion.

The return wheel pin 115d of the return wheel plate 115 illustrated in FIG. 10 projects in the thickness direction of the return wheel plate 115, and the return wheel pin 115d contacts the spring portion 116b in the projected region in the thickness direction. The occupied space in the plane of the return wheel plate 115 can be thereby reduced. On the other hand, as illustrated in FIG. 20, the return wheel lever 215d of the return wheel plate 215 projects outward in the radial direction from the side surface of the return wheel plate 215, and contacts the spring portion 116b in the projected region in the radial direction. When the return wheel lever 215d is provided, the occupied space of the return wheel plate 115 in the thickness direction can be reduced.

According to the variation reduction mechanism 210 of Modified Example 2 configured as described above, the operations and effects similar to those in the variation reduction mechanism 110 in Embodiment 2 can be obtained.

The return gear 111 rotates in the normal hand movement direction (arrow R direction) for displaying a time, and the return wheel lever 215d rotates in the arrow R direction along the rotation of the return gear 111 while pressing the spring portion 116b. The relationship between the position of the return wheel lever 215d and the size of the space 75 of the main plate 70 is set such that the spring portion 116b is elastically deformed by being pressed by the return wheel lever 215d before the torque in the opposite direction by the elastic force of the spring portion 116b exceeds the torque by the friction force between the return gear 111 and the return wheel plate 215, so that the constant torque in the opposite direction, which is applied to the return gear 111, can be maintained.

Although the variation reduction mechanisms 10, 110, 210 of the stop position of the pointer in the above described embodiments and modified examples are targeted to reduce the variations in the stop position of the second hand 96, the variation reduction mechanism according to the present disclosure is not limited to reduce the variations in the stop position of the second hand only. The target of reducing the variations in the stop position may be a minute hand or an hour hand, for example. However, the variations in the stop position are relatively large in the pointer having a high moving frequency. For this reason, the effects of the variation reduction of the second hand having a high moving frequency are larger than the others. In addition to the second hand, the pointer having a high moving frequency includes a pointer for chronograph.

What is claimed is:

1. A variation reduction mechanism of a stop position of a pointer, the variation reduction mechanism comprising:
    a return gear that is driven in conjunction with a time display mechanism;
    a friction member that contacts the return gear to apply a normal force orthogonal to a planar surface of the return gear to be driven; and a return spring member that applies, to the friction member, a torque of the return gear in a direction opposite to a normal hand movement direction for displaying a time, wherein a tooth of the return gear presses a tooth of a gear engaging with the return gear to an end portion in the direction opposite to the normal hand movement direction in a backlash of the tooth of the gear engaging with the return gear, and wherein the normal force yields a friction force that resists rotation of the return gear.

2. The variation reduction mechanism according to claim 1, comprising a regulation member that regulates a rotation range of the return spring member that rotates through the friction member.

3. The variation reduction mechanism according to claim 1, wherein a part of the friction member that contacts the return gear has a projection pressed to the return gear by an elastic force.

4. The variation reduction mechanism according to claim 3, wherein the return gear is made of a material having a hardness harder than that of the projection.

5. The variation reduction mechanism according to claim 3, wherein a part of the return gear that contacts the projection is covered by a hard film having a hardness higher than that of the projection.

6. The variation reduction mechanism according to claim 1, wherein the return spring member is fixed to a stem that rotatably supports the return gear, and the return gear is supported by the stem to be relatively rotatable about the stem.

7. The variation reduction mechanism according to claim 6, wherein the return spring member includes a fixed member fixed to the stem and a spring portion that applies the torque to the fixed member.

8. The variation reduction mechanism according to claim 7, comprising a regulation member that regulates a rotation range of the return spring member that rotates through the friction member, wherein the regulation member projects from the fixed member in a thickness direction.

9. The variation reduction mechanism according to claim 7, comprising a regulation member that regulates a rotation range of the return spring member that rotates through the friction member, wherein the regulation member projects outward from a side surface of the fixed member.

10. The variation reduction mechanism according to claim 1, wherein the return spring member and the friction member are integrated.

11. The variation reduction mechanism according to claim 1, wherein the friction member contacts a planar surface of the return gear to apply a friction force along the planar surface of the return gear to be driven.

12. The variation reduction mechanism according to claim 1, wherein the torque of the return gear is to limit a rotation of a downstream gear in the direction opposite to the normal hand movement direction.

13. A variation reduction mechanism of a stop position of a pointer, the variation reduction mechanism comprising:

a return gear that is driven in conjunction with a time display mechanism;

a friction member that contacts a planar surface of the return gear to apply a friction force along the planar surface of the return gear to be driven; and a return spring member that applies, to the friction member, a torque of the return gear in a direction opposite to a normal hand movement direction for displaying a time, wherein the friction member comprises a central portion and a plurality of arms extending radially outward from the central portion, wherein a contact portion is provided on each of the plurality of arms.

14. The variation reduction mechanism according to claim 13, wherein the contact portion of the friction member contacts the planar surface of the return gear such that a surface of the contact portion and the planar surface of the return gear meet at an angle of greater than 0°, and wherein the contact portion has a greater axial extent than each of the plurality of arms for the contact portion to contact the planar surface without the central portion and the plurality of arms contacting the planar surface.

* * * * *